(12) United States Patent
Lickfelt et al.

(10) Patent No.: US 10,494,854 B2
(45) Date of Patent: Dec. 3, 2019

(54) SYSTEM AND METHOD FOR MANAGING AUTONOMOUS OPERATION OF A PLURALITY OF BARRIERS

(71) Applicant: Honda Motor Co., Ltd., Tokyo (JP)

(72) Inventors: Brian K. Lickfelt, Powell, OH (US); Kevin Lamm, Pataskala, OH (US)

(73) Assignee: Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 15/878,893

(22) Filed: Jan. 24, 2018

(65) Prior Publication Data

US 2019/0048648 A1 Feb. 14, 2019

Related U.S. Application Data

(60) Provisional application No. 62/542,755, filed on Aug. 8, 2017.

(51) Int. Cl.
*E05F 15/77* (2015.01)
*E05F 15/73* (2015.01)
(Continued)

(52) U.S. Cl.
CPC .............. *E05F 15/77* (2015.01); *E04H 6/02* (2013.01); *E04H 6/42* (2013.01); *E05F 15/40* (2015.01); *E05F 15/73* (2015.01); *G01S 17/026* (2013.01); *G01S 19/41* (2013.01); *G01S 19/51* (2013.01); *G05B 15/02* (2013.01); *G07C 9/00007* (2013.01); *H04L 12/2829* (2013.01); *H04W 4/021* (2013.01); *E05F 15/668* (2015.01); *E05F 2015/763* (2015.01); *E05F 2015/767* (2015.01); *E05Y 2400/45* (2013.01);

(Continued)

(58) Field of Classification Search
None
See application file for complete search history.

(56) References Cited

U.S. PATENT DOCUMENTS 5,350,986 A 9/1994 Long et al.
5,625,980 A 5/1997 Teich et al.
(Continued)

OTHER PUBLICATIONS

Office Action of U.S. Appl. No. 15/803,293 dated Jul. 9, 2019, 41 pages.
(Continued)

*Primary Examiner* — Daniell L Negron
(74) *Attorney, Agent, or Firm* — Rankin, Hill & Clark LLP

(57) ABSTRACT

A system and method for managing autonomous operation of a plurality of barriers that include sending at least one barrier control signal from a vehicle to a barrier controller associated with a first barrier of the plurality of barriers to traverse the first barrier. The system and method also include sending at least one barrier control signal from the vehicle to a barrier controller associated with a second barrier of the plurality of barriers to traverse the second barrier. The system and method additionally include sending at least one barrier status update request signal to the barrier controller associated with the first barrier to determine an updated state of the first barrier. The system and method further include sending at least one barrier status update request signal to the barrier controller associated with the second barrier to determine an updated state of the second barrier.

20 Claims, 7 Drawing Sheets

(51) Int. Cl.
*G07C 9/00* (2006.01)
*G01S 19/51* (2010.01)
*G05B 15/02* (2006.01)
*E05F 15/40* (2015.01)
*E04H 6/42* (2006.01)
*H04W 4/021* (2018.01)
*E04H 6/02* (2006.01)
*G01S 17/02* (2006.01)
*H04L 12/28* (2006.01)
*G01S 19/41* (2010.01)
*E05F 15/668* (2015.01)

(52) U.S. Cl.
CPC ... *E05Y 2400/818* (2013.01); *E05Y 2800/426* (2013.01); *E05Y 2900/106* (2013.01); *E05Y 2900/40* (2013.01); *G07C 2009/00928* (2013.01)

(56) References Cited

U.S. PATENT DOCUMENTS

| | | | |
|---|---|---|---|
| 5,793,300 | A | 8/1998 | Suman et al. |
| 6,091,217 | A | 7/2000 | Parsadayan |
| 7,332,999 | B2 * | 2/2008 | Fitzgibbon ......... G07C 9/00182 340/12.15 |
| 8,648,695 | B2 | 2/2014 | Fitzgibbon et al. |
| 9,879,466 | B1 | 1/2018 | Yu |
| 2002/0002443 | A1 | 1/2002 | Ames et al. |
| 2002/0170685 | A1 | 11/2002 | Weik, III et al. |
| 2003/0102836 | A1 | 6/2003 | McCall |
| 2005/0140321 | A1 | 6/2005 | Wojciak, Jr. |
| 2005/0206497 | A1 | 9/2005 | Tsui et al. |
| 2005/0212681 | A1 | 9/2005 | Dzurko et al. |
| 2006/0071155 | A1 | 4/2006 | Chen |
| 2006/0077035 | A1 | 4/2006 | Mamaloukas |
| 2006/0157206 | A1 | 7/2006 | Weik, III et al. |
| 2006/0220834 | A1 | 10/2006 | Maeng |
| 2007/0046232 | A1 | 3/2007 | Mullet et al. |
| 2007/0085067 | A1 | 4/2007 | Lewis |
| 2007/0188120 | A1 | 8/2007 | Mullet et al. |
| 2009/0269635 | A1 | 10/2009 | Muramatsu |
| 2010/0085145 | A1 | 4/2010 | Laird |
| 2011/0032073 | A1 | 2/2011 | Mullet et al. |
| 2011/0193700 | A1 | 8/2011 | Fitzgibbon et al. |
| 2012/0255231 | A1 | 10/2012 | Jenkins et al. |
| 2012/0265874 | A1 | 10/2012 | Hoh et al. |
| 2013/0042530 | A1 | 2/2013 | Leivenzon et al. |
| 2013/0117078 | A1 | 5/2013 | Weik, III et al. |
| 2013/0147616 | A1 | 6/2013 | Lambert et al. |
| 2014/0125499 | A1 | 5/2014 | Cate et al. |
| 2014/0167961 | A1 | 6/2014 | Finlow-Bates |
| 2014/0305599 | A1 | 10/2014 | Pimenov |
| 2014/0320263 | A1 | 10/2014 | Fan et al. |
| 2015/0084779 | A1 | 3/2015 | Saladin et al. |
| 2015/0302672 | A1 | 10/2015 | Kalsi et al. |
| 2016/0053699 | A1 | 2/2016 | Ozkan |
| 2016/0104364 | A1 | 4/2016 | Brooks et al. |
| 2016/0130853 | A1 | 5/2016 | Tehranchi |
| 2016/0148451 | A1 | 5/2016 | Menkveld |
| 2017/0034485 | A1 | 2/2017 | Scalisi |
| 2017/0138111 | A1 | 5/2017 | Lietz et al. |
| 2018/0030764 | A1 | 2/2018 | Shaw et al. |
| 2018/0194344 | A1 | 7/2018 | Wang et al. |
| 2018/0216389 | A1 | 8/2018 | Tsui et al. |
| 2018/0247475 | A1 | 8/2018 | Archbold |

OTHER PUBLICATIONS

Notice of Allowance of U.S. Appl. No. 15/810,609 dated Jul. 11, 2018, 30 pages.
Notice of Allowance of U.S. Appl. No. 15/791,063 dated Mar. 29, 2019, 21 pages.
Office Action of U.S. Appl. No. 15/803,293 dated Mar. 29, 2019, 57 pages.
Office Action of U.S. Appl. No. 15/861,027 dated May 1, 2019, 14 pages.
Office Action of U.S. Appl. No. 15/803,293 dated Mar. 22, 2018, 48 pages.
Office Action of U.S. Appl. No. 15/791,063 dated Oct. 30, 2018, 71 pages.
Office Action of U.S. Appl. No. 15/713,782 dated Sep. 7, 2018, 47 pages.
Office Action of U.S. Appl. No. 15/803,293 dated Nov. 29, 2018, 52 pages.
Office Action of U.S. Appl. No. 15/861,027 dated Dec. 14, 2018, 40 pages.
Office Action of U.S. Appl. No. 15/696,211 dated Jan. 2, 2019, 48 pages.
Office Action of U.S. Appl. No. 15/884,730 dated Jan. 10, 2019, 35 pages.
Office Action of U.S. Appl. No. 15/696,211 dated May 31, 2019, 23 pages.
Office Action of U.S. Appl. No. 15/884,730 dated Jun. 28, 2019, 22 pages.

* cited by examiner

SYSTEM AND METHOD FOR MANAGING AUTONOMOUS OPERATION OF A PLURALITY OF BARRIERS

This application claims priority to U.S. Provisional Application Ser. No. 62/542,755 filed on Aug. 8, 2017, which is expressly incorporated herein by reference.

Additionally, this application expressly incorporates herein by reference each of the following in their respective entireties: U.S. application Ser. No. 15/696,211 filed on Sep. 6, 2017; U.S. application Ser. No. 15/713,782 filed on Sep. 25, 2017; U.S. application Ser. No. 15/791,063 filed on Oct. 23, 2017; U.S. application Ser. No. 15/810,609 filed on Nov. 13, 2017; and U.S. application Ser. No. 15/861,027 filed on Jan. 3, 2018.

BACKGROUND

In some cases, a location such as a dwelling may include multiple movable barriers such as an entry gate and a garage door. The multiple barriers may be opened or closed as a vehicle arrives or departs to and from the dwelling. However, in some circumstances the opening and closing of each of the barriers may only be completed by respective barrier controlling inputs and/or devices that are each associated with the respective barriers. This functionality may require a driver to utilize respective inputs and/or devices in a specific order to ensure that an intended barrier is opened and/or closed.

In some scenarios, when the vehicle is arriving towards each of the barriers the driver has to time when to manually actuate the opening of the each of the respective barriers. As it may take a significant time to move each of the barriers from one state to another (e.g., closed to open), the driver may be forced to wait until each of the barriers is fully opened before parking the vehicle. For example, the vehicle 102 may arrive in front of the entry gate with it having only partially completing its opening cycle while the garage door has not yet started its opening cycle. Consequently, the vehicle driver must completely stop the vehicle and wait for one or both of the entry gate and the garage door to completely open thereby wasting time and fuel/energy.

In some cases, signals being sent simultaneously to both of the barriers may conflict with one another when being sent from a single transceiver of the vehicle. Such an issue may cause one or more signals to be interrupted and cause further delays with respect to opening or closing on or more of the multiple barriers. Consequently, the vehicle driver may have to manually actuate each of the barriers separately in order to avoid such signal conflicts which may cause driver distraction and some of the aforementioned drawbacks.

BRIEF DESCRIPTION

According to one aspect, a computer-implemented method for managing autonomous operation of a plurality of barriers that includes sending at least one barrier control signal from a vehicle to a barrier controller associated with a first barrier of the plurality of barriers to traverse the first barrier. The method also includes sending at least one barrier control signal from the vehicle to a barrier controller associated with a second barrier of the plurality of barriers to traverse the second barrier. The method additionally includes sending at least one barrier status update request signal to the barrier controller associated with the first barrier to determine an updated state of the first barrier. The updated state of the first barrier is determined upon determining a current state of the first barrier and the second barrier and traversing the first barrier and the second barrier. The method further includes sending at least one barrier status update request signal to the barrier controller associated with the second barrier to determine an updated state of the second barrier. The updated state of the second barrier is determined upon determining the updated state of the first barrier.

According to another aspect, a system for managing autonomous operation of a plurality of barriers that includes a memory storing instructions when executed by a processor that cause the processor to send at least one barrier control signal from a vehicle to a barrier controller associated with a first barrier of the plurality of barriers to traverse the first barrier. The instructions also cause the processor to send at least one barrier control signal from the vehicle to a barrier controller associated with a second barrier of the plurality of barriers to traverse the second barrier. The instructions additionally cause the processor to send at least one barrier status update request signal to the barrier controller associated with the first barrier to determine an updated state of the first barrier. The updated state of the first barrier is determined upon determining a current state of the first barrier and the second barrier and traversing the first barrier and the second barrier. The instructions further cause the processor to send at least one barrier status update request signal to the barrier controller associated with the second barrier to determine an updated state of the second barrier. The updated state of the second barrier is determined upon determining the updated state of the first barrier.

According to still another aspect, a computer readable storage medium storing instructions that when executed by a computer, which includes at least a processor, causes the computer to perform a method that includes sending at least one barrier control signal from a vehicle to a barrier controller associated with a first barrier of a plurality of barriers to traverse the first barrier. The method also includes sending at least one barrier control signal from the vehicle to a barrier controller associated with a second barrier of the plurality of barriers to traverse the second barrier. The method additionally includes sending at least one barrier status update request signal to the barrier controller associated with the first barrier to determine an updated state of the first barrier. The updated state of the first barrier is determined upon determining a current state of the first barrier and the second barrier and traversing the first barrier and the second barrier. The method further includes sending at least one barrier status update request signal to the barrier controller associated with the second barrier to determine an updated state of the second barrier. The updated state of the second barrier is determined upon determining the updated state of the first barrier.

DETAILED DESCRIPTION

Figure 1:
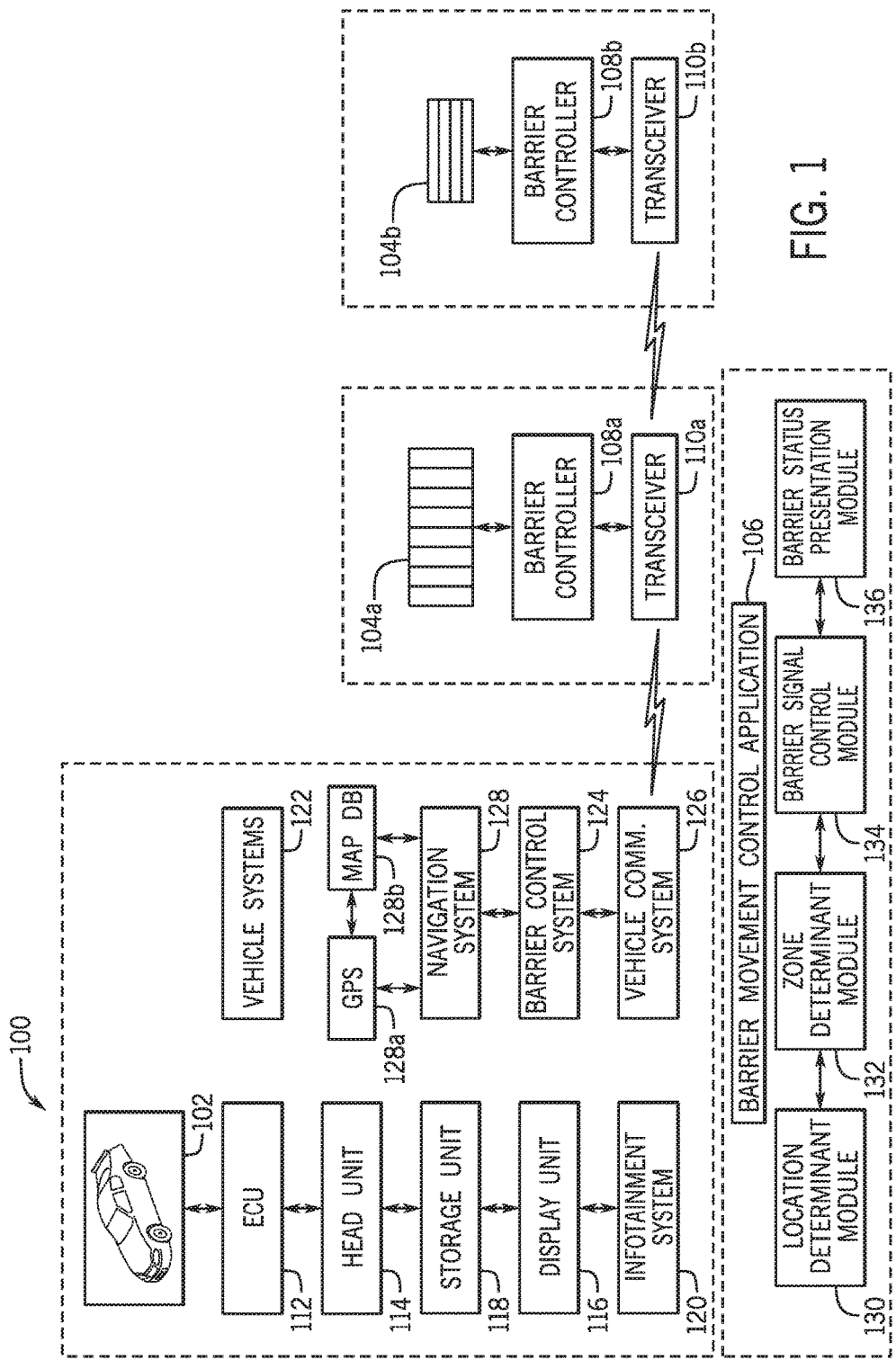
FIG. 1 is a schematic view of an operating environment for implementing systems and methods within a vehicle for managing autonomous operation of a plurality of barriers according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods within a vehicle 102 for managing autonomous operation of a plurality of barriers according to an exemplary embodiment. The components of the environment 100, as well as the components of other systems, hardware architectures, and software architectures discussed herein, can be combined, omitted, or organized into different architectures for various embodiments.

Generally, the environment includes a barrier movement control application (barrier control application) 106 that is executed to provide a plurality of zones and commands associated with the autonomous operation of the plurality of barriers. In one embodiment, the plurality of barriers may include an entry gate, an exit gate, a primary garage door, a secondary garage door, and the like that are located within determined vicinity of one another (e.g., 500 feet).

For purposes of simplicity, within this disclosure, the plurality of barriers may include the barrier 104a that may be represented and described as an entry/exit gate and may be provided as a first barrier as the vehicle 102 arrives towards the plurality of barriers. Additionally, the barrier 104a may include a second barrier as the vehicle 102 departs away from the plurality of barriers.

For additional purposes of simplicity, within this disclosure, the plurality of barriers may also include a barrier 104b that may be represented and described as a garage door that may be provided as a second barrier as the vehicle 102 arrives towards the plurality of barriers and as a primary barrier as the vehicle 102 departs away from the plurality of barriers. However, it is to be appreciated that the plurality of barriers may include one or more barriers in addition to the barriers 104a, 104b represented within FIG. 1. Additionally, the plurality of barriers may include numerous alternate and/or additional types of barriers that include various types of entry ways and/or exit ways that may be traversed to an opened state, a closed state, and a partially-opened state.

With continued reference to FIG. 1, the barrier control application 106 may be utilized to ensure that each of the plurality of barriers 104a, 104b is automatically traversed to an opened state during the arrival of the vehicle 102 towards the barriers 104a, 104b without any interference that may be caused based on the sending and receiving of signals within an overlapping short period of time to the plurality of barriers 104a, 104b to and from the vehicle 102 as the vehicle 102 is arriving towards the barriers 104a, 104b. Additionally, the barrier control application 106 may be utilized to ensure that each of the barriers 104a, 104b is automatically traversed to the closed state or the opened state as required during the departure of the vehicle 102 away from the barriers 104a, 104b without any interference that may be caused based on the sending and receiving of signals within an overlapping short period of time to the plurality of barriers 104a, 104b.

As discussed in more detail below, the barrier control application 106 may ensure that one or more signals are automatically sent from the vehicle 102 to components of the barriers 104a, 104b to determine a current state of each of the plurality of barriers 104a, 104b, traverse each of the plurality of barriers 104a, 104b, and determine an updated state of the each of the plurality of barriers 104a, 104b as the vehicle 102 arrives towards the plurality of barriers 104a, 104b or departs away from the plurality of barriers 104a, 104b. In particular, the application 106 may ensure an updated state of the plurality of barriers 104a, 104b may be provided to a user (e.g., driver of the vehicle 102) via a barrier status user interface (not shown) presented within the vehicle 102 without any delay that may potentially be caused by a simultaneous sending and receiving of signals between the vehicle 102 and the components of the barriers 104a, 104b.

In an exemplary embodiment, the plurality of barriers 104a, 104b may be connected to and controlled by respective barrier controllers 108a, 108b. The barrier controllers 108a, 108b may include internal processing memory, an interface circuit, and bus lines for transferring data, sending commands, and communicating with the components associated with and/or connected to the respective barriers 104a, 104b. In one embodiment, the barrier controllers 108a, 108b may be connected to a remote control (e.g., garage door remote) (not shown) and/or respective remote controls, and an interface device (e.g., wall inputs, numeric key pad) (not shown) and/or respective interface devices that may be used by a user to provide one or more inputs to control movement of the one or more of the plurality of barriers 104a, 104b.

The barrier controllers 108a, 108b may be operably connected to respective transceivers 110a, 110b. In one embodiment, the barrier controllers 108a, 108b may be configured to control operation of the transceivers 110a, 110b to receive various types of signals from the vehicle 102. Additionally, the barrier controllers 108a, 108b may be configured to control operation of the transceivers 110a, 110b to send (e.g., transmit) various types of signals to the vehicle 102, as discussed below. In particular, the barrier controllers 108a, 108b may evaluate the one or more signals received by the transceivers 110a, 110b and may instruct the respective transceivers 110a, 110b to send the one or more response signals.

With continued reference to FIG. 1, the vehicle 102 may include a plurality of components that may be operably connected for computing communication via a bus (not shown) (e.g., a Controller Area Network (CAN) or a Local Interconnect Network (LIN) protocol bus), an input/output interface (I/O interface) and/or other wired and wireless technologies. The plurality of components of the vehicle 102 may generally include an electronic control unit (ECU) 112, a head unit 114, a display unit 116, a storage unit 118, and an infotainment system 120. Additionally, the plurality of components of the vehicle 102 may also include a plurality of vehicle systems 122 in addition to the infotainment system 120.

In an exemplary embodiment, the ECU 112 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 112 and other components, networks, and data sources, of the environment 100. In one embodiment, the ECU 112 may execute one or more operating systems, applications, and/or interfaces that are associated with the vehicle 102 and/or the plurality of vehicle systems 122.

The ECU 112 may also be operably connected for computer communication to the head unit 114. The head unit 114 may include internal processing memory, an interface circuit, and bus lines (components of the head unit not shown) for transferring data, sending commands, and communicating with the components of the vehicle 102. In one or more embodiments, the ECU 112 may execute one or more operating systems, applications, and/or interfaces that are associated to the vehicle 102 and/or the plurality of vehicle systems 122.

In one embodiment, the head unit 114 may be connected to the infotainment system 120. The infotainment system 120 may act as an information hub of the vehicle 102 that presents and delivers information to the user (e.g., audio, video, HVAC, barrier controls, etc.). In one embodiment, the infotainment system 120 may be operably connected to a barrier control system 124 of the vehicle 102 to send and receive data signals that may be utilized to independently control each of the plurality of barriers 104a, 104b.

The display unit 116 may be disposed within a center stack area of the vehicle 102. Based on the operation of the infotainment system 120, the display unit 116 may display one or more vehicle human machine interfaces (vehicle HMI) to provide the user with various types of information and/or to receive one or more inputs from the user. More specifically, the vehicle HMI may pertain to one or more operating systems, vehicle system interfaces, and application interfaces, including interfaces pertaining to the barrier control application 106. The vehicle HMI may present one or more user interfaces of the barrier control application 106 including a barrier configuration user interface (not shown) and the barrier status user interface. In one embodiment, the barrier status user interface may provide the user with a current state and an updated state of the each of the barriers 104a, 104b, as the vehicle 102 is arriving towards the barriers 104a, 104b and departing away from the barriers 104a, 104b based on locations of a plurality of zones (e.g., determined signal actuation locations) associated with each of the plurality of barriers 104a, 104b.

In an exemplary embodiment, the vehicle 102 may additionally include a storage unit 118. The storage unit 118 may store one or more operating systems, applications, associated operating system data, application data, vehicle system and subsystem user interface data, and the like that are executed by the ECU 112, the head unit 114, and the plurality of vehicle systems 122. The storage unit 118 may include respective barrier profiles that are associated with each of the plurality of barriers 104a, 104b. The barrier profiles may be created, populated and/or updated by the barrier control application 106.

In one embodiment, the barrier profiles may include details that are associated with each of the plurality of barriers 104a, 104b as identified by the user. The details may include a name assigned to each of the plurality of barriers 104a, 104b by the user (e.g., entry gate, primary garage door), a geo-location associated with each of the plurality of barriers 104a, 104b (e.g., GPS, DGPS coordinates of the specific locations of each of the plurality of barriers 104a, 104b), and a plurality of global positioning coordinates associated with respective boundaries of the zones associated with each of the plurality of barriers 104a, 104b. As discussed in more detail below, the barrier profiles may be created, populated, updated, and/or evaluated to retrieve data based on the execution of the barrier control application 106.

In addition to the infotainment system 120, the plurality of vehicle systems 122 may include, but may not be limited to, a vehicle communication system 126, the barrier control system 124, and a navigation system 128. In one embodiment, the vehicle communication system 126 may include one or more transceivers that are capable of providing wireless computer communications utilizing various protocols to be utilized to send/receive electronic signals internally to components and systems within the vehicle 102 and to external devices including the transceiver 110a operably connected to the barrier controller 108a associated with the barrier 104a and the transceiver 110b operably connected to the barrier controller 108b associated with the barrier 104b.

In one embodiment, the barrier control system 124 of the vehicle 102 may be utilized to provide manual or automatic commands to the vehicle communication system 126. In particular, the barrier control system 124 may utilize the vehicle communication system 126 to send the one or more barrier control signals to actuate movement of each of the plurality of barriers 104a, 104b to open or close the respective barriers 104a, 104b based on one or more user inputs. In one configuration, the barrier control system 124 may be included as part of a HOMELINK® trainable garage door opening device (or other embedded, integrated accessory of the vehicle 102) that is integrated within a ceiling panel (not shown) or rearview mirror (not shown) of the vehicle 102. In some configurations, the barrier control system 124 may include one or more input buttons (not shown) that may be inputted by the user to actuate movement of one or more of the plurality of barriers 104a, 104b.

The vehicle communication system 126 may be capable of providing wired or wireless computer communications utilizing various protocols to send/receive non-transitory signals internally to the plurality of components of the vehicle 102 and/or externally to external devices. Generally, these protocols include a wireless system (e.g., IEEE 802.11 (Wi-Fi), IEEE 802.15.1 (Bluetooth)), a near field communication system (NFC) (e.g., ISO 13157), a local area network (LAN), and/or a point-to-point system. More particularly, the vehicle communication system 126 may be utilized by the barrier control system 124 to send (i.e., transmit) one or more radio frequency (RF) signals in one or more frequencies and/or radio bands to communicate commands and data to the barrier controllers 108a, 108b through the respective transceivers 110a, 110b.

In one embodiment, the vehicle communication system 126 may communicate one or more command signals that include but are not limited to, one or more barrier status request signals, one or more barrier control signals, and one or more barrier status update request signals to the respective transceivers 110a, 110b based on the location of the vehicle 102 with respect to the plurality of zones associated with each of the plurality of barriers 104a, 104b and/or a data flag that is stored within the storage unit 118.

As discussed in more detail below, the barrier control application 106 may utilize the vehicle communication system 126 to send the one or more barrier status request signals to be evaluated by the barrier controller 108a and/or the barrier controller 108b based on the entrance or exit of the vehicle 102 to one or more status request zones associated with each of the barriers 104a, 104b as provided by the application 106. Upon evaluating the barrier status request signal(s), the respective barrier controllers 108a, 108b may provide the current state of each of the respective barriers 104*a*, 104*b* as the opened state, the partially opened state, or the closed state as the vehicle 102 arrives towards or departs away from one or more of the plurality of barriers 104*a*, 104*b*.

The vehicle communication system 126 may be utilized to receive one or more barrier status response signals sent from the respective transceivers 140*a*, 140*b* to be interpreted by the barrier control application 106 to determine the current state of each of the plurality of barriers 104*a*, 104*b* as provided by the respective barrier controllers 108*a*, 108*b*. The application 106 may additionally utilize the vehicle communication system 126 to send one or more barrier control signals to remotely control movement of each of the respective plurality of barriers 104*a*, 104*b* (e.g., actuate movement of the barrier 104*a* or the barrier 104*b* to be traversed to the opened state or the closed state) based on the entrance and/or exit of the vehicle 102 to and from barrier control zones associated with each of the plurality of barriers 104*a*, 104*b*, and based on the determination of the current state of each of the plurality of barriers 104*a*, 104*b*.

As discussed below, the application 106 may additionally utilize the vehicle communication system 126 to send one or more barrier status update request signals to the respective transceivers 110*a*, 110*b* in order to determine the updated state of each of the plurality of barriers 104*a*, 104*b*. The application 106 may further utilize the vehicle communication system 126 to receive one or more barrier status update response signals to determine the updated states of each of the respective barriers 104*a*, 104*b* to thereby determine if each of the respective barriers 104*a*, 104*b* has traversed to the opened state or the closed state based on barrier control signals sent to the barrier controller 108*a* and/or the barrier controller 108*b*. In one embodiment, the barrier control application 106 may present the barrier status user interface with the updated state of the respective barriers 104*a*, 104*b* as provided by the respective barrier controllers 108*a*, 108*b* to allow the user to determine the updated state of each of the plurality of barriers 104*a*, 104*b* as the vehicle 102 is arriving towards the plurality of barriers 104*a*, 104*b* or departing away from the plurality of barriers 104*a*, 104*b*.

In an exemplary embodiment, the navigation system 128 of the vehicle 102 may be connected to the head unit 114, the infotainment system 120, and the display unit 116 to provide a map user interface (not shown) to the driver of the vehicle 102. The navigation system 128 may include a global position system 128*a* (GPS) that may also be used to localize (i.e., determine the GPS or DGPS coordinates) the vehicle 102. The navigation system 128 may include its own processor and memory that communicate with the GPS 128*a* to determine and provide route guidance to the driver of the vehicle 102.

In one or more embodiments, the navigation system 128 may include and/or may connect to and access a map database 132*b* to present one or more details and graphics on the map user interface through the display unit 116. The map database 132*b* may include geographical maps of one or more locations (e.g., countries, regions, cities) in which the vehicle 102 may be driven. The map database 132*b* may also include locational data that pertains to each of the plurality of barriers 104*a*, 104*b*. In one embodiment, the barrier control application 106 may utilize the navigation system 128 to localize each of the plurality of barriers 104*a*, 104*b* and to determine a plurality of global positioning coordinates associated the specific locations at which each of the plurality of barriers 104*a*, 104*b* is located. The plurality of global positioning coordinates associated with the one or more areas surrounding the specific locations at which each of the plurality of barriers 104*a*, 104*b* is located may constitute boundaries of the plurality of zones associated with the barriers 104*a*, 104*b*.

II. The Barrier Movement Control Application

The components of the barrier control application 106 will now be described according to an exemplary embodiment and with reference to FIG. 1. In an exemplary embodiment, the barrier control application 106 may be stored on the storage unit 118 of the vehicle 102. In additional embodiments, the barrier control application 106 may be stored on an external server infrastructure (not shown) and may be accessed by the vehicle communication system 126 to be executed by the ECU 112 and/or the head unit 114 of the vehicle 102. The barrier control application 106 may be executed when a battery/accessory state of the vehicle 102 is enabled.

In an exemplary embodiment, the barrier control application 106 may include a location determinant module 130, a zone determinant module 132, a barrier signal control module 134, and a barrier status presentation module 136. It is to be appreciated that the barrier control application 106 may include additional modules and/or sub-modules that are configured to execute one or more functions of the application 106. As will be described below, the location determinant module 130 may determine the location of the vehicle 102 with respect to the (location of) plurality of barriers 104*a*, 104*b*. The location determinant module 130 may be also be utilized to store the data flag that represents the existence the plurality of barriers 104*a*, 104*b* that are located within a predetermined vicinity of one another. In one embodiment, the location determinant module 130 may determine the location of the vehicle 102 with respect to entering or exiting one or more of the plurality of zones as determined by the zone determinant module 132.

The plurality of zones determined by the zone determinant module 132 may each be respectively associated with each of the barriers 104*a*, 104*b* and may be utilized to send one or more signals between the vehicle communication system 126 and the transceivers 110*a*, 110*b* operably connected to the respective barrier controllers 108*a*, 108*b*. The barrier signal control module 134 may operably control the sending of one or more signals to determine the current state of each of the plurality of barriers 104*a*, 104*b*, to traverse each of the plurality of barriers 104*a*, 104*b* to the opened state or the closed state, and/or to determine the updated state of each of the plurality of barriers 104*a*, 104*b* in a specific manner based on the location of the vehicle 102 and the stored data flag that may be utilized by the application 106 to executed a dedicated software flow.

In one embodiment, the barrier status presentation module 136 may receive data from the barrier signal control module 134 and may present the barrier status user interface that includes the updated state of the barriers 104*a*, 104*b* upon the sending of the barrier control signals to automatically control each of the barriers 104*a*, 104*b* to traverse to the opened state or the closed state. The barrier status user interface may allow the user to determine if each of the barriers 104*a*, 104*b* have automatically traversed to the opened state based on the vehicle 102 arriving towards the barriers 104*a*, 104*b*. Additionally, the barrier status user interface may allow the user to determine if each of the barriers 104*a*, 104*b* have automatically traversed to the closed state based on the vehicle 102 departing away from the barriers 104*a*, 104*b*.

As discussed, the user may create respective barrier profiles associated with each of the plurality of barriers 104a, 104b. In one embodiment, upon creation of the respective barrier profiles, the location determinant module 130 may communicate with the navigation system 128 of the vehicle 102 to determine the respective geo-locations associated with each of the plurality of barriers 104a, 104b. In one embodiment, the location determinant module 130 may store the data flag within the storage unit 118 of the vehicle 102 that indicates the existence of the plurality of barriers 104a, 104b within a predetermined distance of one another at a particular location (e.g., multiple barriers located within 15 feet of one another at a dwelling) based on determining that the respective geo-locations associated with each of the barriers 104a, 104b are within a predetermined distance from one another.

The data flag may be further utilized by the barrier signal control module 134 to execute the dedicated software flow to send one or more signals at one or more instances based on the existence of the plurality of barriers 104a, 104b within the predetermined distance of one another. As discussed below, the geo-locations associated with each of the plurality of barriers 104a, 104b may also be used to determine if the vehicle 102 is being driven and is arriving towards the barriers 104a, 104b or if the vehicle 102 is departing away from the barriers 104a, 104b.

In one embodiment, the user may input one or more user interface icons (not shown) via the vehicle HMI presented on the display unit 116 to create the barrier profiles associated with each of the respective barriers 104a, 104b. For example, the user may wish to create the barrier profile that is associated to the barrier 104a (e.g., entry/exit gate) and the barrier profile that is associated to the barrier 104b (e.g., garage door) that are located at the user's home. The respective barrier profiles may enable the application 106 to communicate with the barrier controller 108a and the barrier controller 108b associated with the respective barriers 104a, 104b at specific instances based on the execution of the dedicated software flow by the barrier control application 106.

Upon the user selecting the respective user interface icon to create the barrier profiles associated with the respective barriers 104a, 104b, the barrier control application 106 may store the barrier profiles on the storage unit 118 of the vehicle 102 and may send respective indications to the location determinant module 130 indicating that the user has setup the barrier profiles associated with the respective barriers 104a, 104b. In an exemplary embodiment, upon receiving the indications that the user has setup the barrier profiles associated with the respective barriers 104a, 104b, the location determinant module 130 may present a barrier location determination user interface (not shown) to the user.

The barrier location determination user interface may be utilized by the user to actuate the determination of the geo-location of the barrier 104a and the geo-location of the barrier 104b. In particular, the user may actuate the determination of the geo-location associated with the barrier 104a, within a predetermined short distance (e.g., 15 feet) of the vehicle 102 entering the area enclosed by the barrier 104a. Similarly, the user may actuate the determination of the geo-location associated with the barrier 104b, within a predetermined short distance of the vehicle 102 entering the area enclosed by the barrier 104b.

In one embodiment, upon the user actuation the determination of the geo-locations of each of the plurality of barriers 104a, 104b, the location determinant module 130 may communicate with the navigation system 128 of the vehicle 102 to determine locational coordinates (e.g., GPS, DGPS coordinates) of each of the plurality of barriers 104a, 104b. The navigation system 128 may access the GPS 128a to determine the locational coordinates associated with the location of the vehicle 102 being located within the predetermined short distance of the respective barriers 104a, 104b and upon passing the respective barriers 104a, 104b, as determined based on additional vehicle sensors of the vehicle 102, including but not limited to, image sensors, RADAR/LIDAR sensors, and the like (not shown).

Upon determining the locational coordinates, an indication indicating the locational coordinates may be communicated by the navigation system 128 to the location determinant module 130. Upon receiving the locational coordinates associated with the location of the vehicle 102 upon passing the respective barriers 104a, 104b, the location determinant module 130 may determine the respective geo-locations of each of the plurality of barriers 104a, 104b. The location determinant module 130 may additionally store the geo-locations of the respective barriers 104a, 104b within the storage unit 118 of the vehicle 102 to be further accessed by the application 106 upon the vehicle 102 arriving towards the barriers 104a, 104b, or departing away from the barriers 104a, 104b.

Upon the storage of the geo-locations associated with the barriers 104a, 104b, the location determinant module 130 may store the data flag within the storage unit 118 that represents the existence of both of the barriers 104a, 104b that are located within a predetermined distance of one another to be utilized by the application 106 to send respective signals to the barrier controllers 108a, 108b based on the arrival or departure of the vehicle 102 towards/away to/from the plurality of barriers 104a, 104b.

In an exemplary embodiment, the stored respective geo-locations of the barriers 104a, 104b may be used by the application 106 to determine if and when the vehicle 102 is located within a predetermined vicinity of the plurality of barriers 104a, 104b, if the vehicle 102 is arriving towards one or more of the plurality of barriers 104a, 104b, or if the vehicle 102 is departing away from the barriers 104a, 104b. The stored geo-locations may additionally be used by the application 106 to determine the plurality of zones associated with each of the respective barriers 104a, 104b. As discussed below, the data flag stored by the location determinant module 130 and the plurality of zones may be utilized by the application 106 to send one or more signals to the barrier controllers 108a, 108b based on the location, types of signals, and/or traveling direction of the vehicle 102 with respect to each of the barriers 104a, 104b.

Figure 2:
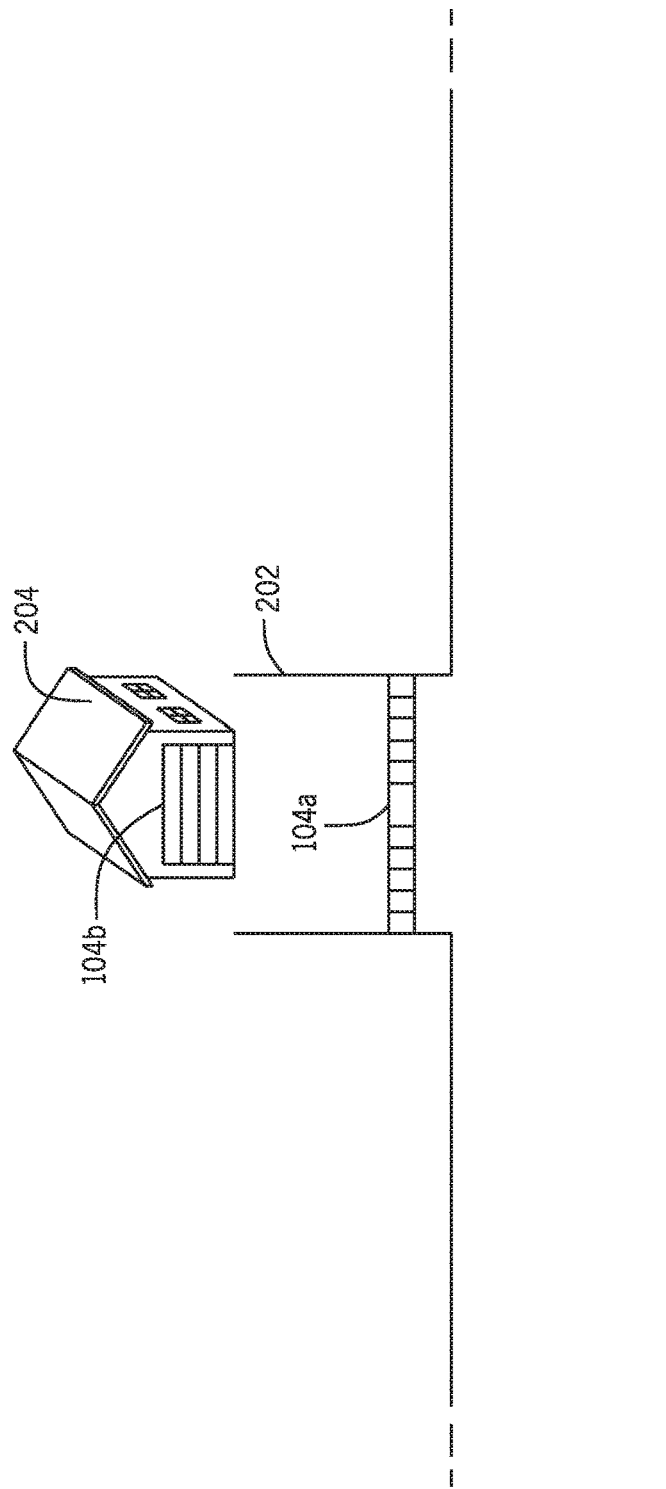
FIG. 2 is an illustrative example of the plurality of barriers according to an exemplary embodiment.

With reference to FIG. 2, an illustrative example of the plurality of barriers 104a, 104b according to an exemplary embodiment, the location determinant module 130 may determine the location and/or the traveling direction of the vehicle 102 with respect to each of the barriers 104a, 104b. In particular, the location determinant module 130 may determine when the vehicle 102 is arriving towards the barrier 104a that is configured as an entry/exit gate, when the vehicle 102 passes the barrier 104a and enters a location 202 (e.g., driveway) enclosed by the barrier 104a before passing the barrier 104a. Additionally, the location determinant module 130 may determine when the vehicle 102 is arriving towards the barrier 104b, that is configured as a garage door, (e.g., as the vehicle 102 travels on the driveway) after passing the barrier 104a and when the vehicle 102 enters a location 204 enclosed by the barrier 104b (e.g., garage). Similarly, the location determinant module 130 may determine when the vehicle 102 is departing away from the barrier 104*b* after exiting the location 204 enclosed by the barrier 104*b* and passing the barrier 104*b*. Additionally, the location determinant module 130 may determine when the vehicle 102 is departing away from the barrier 104*a* upon passing the barrier 104*a* after the vehicle 102 exits the location 202 enclosed by the barrier 104*a*.

More specifically, the location determinant module 130 may communicate with the navigation system 128 of the vehicle 102 to determine the locational coordinates associated with the (location of the) vehicle 102. In particular, as the vehicle 102 is being driven, the location determinant module 130 may communicate with the navigation system 128 to continually determine the location coordinates (e.g., GPS, DGPS coordinates) associated with the vehicle 102 as provided by the GPS 128*a*. The location determinant module 130 may access the storage unit 118 to determine if the data flag was previously stored within the storage unit 118 based on the previously determined geo-location of the barriers 104*a*, 104*b* within a predetermined vicinity of one another.

In one embodiment, if the location determinant module 130 retrieves the data flag from the storage unit 118, the location determinant module 130 may access the barrier profiles associated with the respective barriers 104*a*, 104*b* that are stored on the storage unit 118. Upon retrieving the barrier profiles associated with the respective barriers 104*a*, 104*b*, the location determinant module 130 may retrieve the respective geo-locations associated each of the plurality of barriers 104*a*, 104*b*. The location determinant module 130 may further communicate with the navigation system 128 to determine if the vehicle 102 is within a predetermined distance (e.g., within a 0-200 yards) of the respective geo-locations associated with each of the plurality of barriers 104*a*, 104*b*.

If the navigation system 128 determines that the vehicle 102 is within the predetermined vicinity of the geo-location associated with the barrier 104*a* and/or the geo-location associated with the barrier 104*b*, the location determinant module 130 may determine when the vehicle 102 is arriving towards the barriers 104*a*, 104*b* or departing away from the barriers 104*a*, 104*b* based on the respective stored geo-locations of each of the plurality of barriers 104*a*, 104*b* within the respective barrier profiles. In particular, the location determinant module 130 may communicate with the navigation system 128 to utilize the GPS 128*a* and the map database 128*b* to evaluate if the vehicle 102 is being driven towards or away from the geo-locations associated with the respective barriers 104*a*, 104*b*.

The location determinant module 130 may determine that the vehicle 102 is arriving towards one or more of the plurality of barriers 104*a*, 104*b* if the navigation system 128 determines that a distance between the locational coordinates of the vehicle 102, as provided by the GPS 128*a*, and the respective geo-locations of one or more of the plurality of barriers 104*a*, 104*b* is decreasing. Conversely, the location determinant module 130 may determine that the vehicle 102 is departing away from one or more of the plurality of barriers 104*a*, 104*b* if the navigation system 128 determines that a distance between the locational coordinates of the vehicle 102, as provided by the GPS 128*a*, and the respective geo-locations of one or more of the plurality of barriers 104*a*, 104*b* is increasing.

Figure 3:
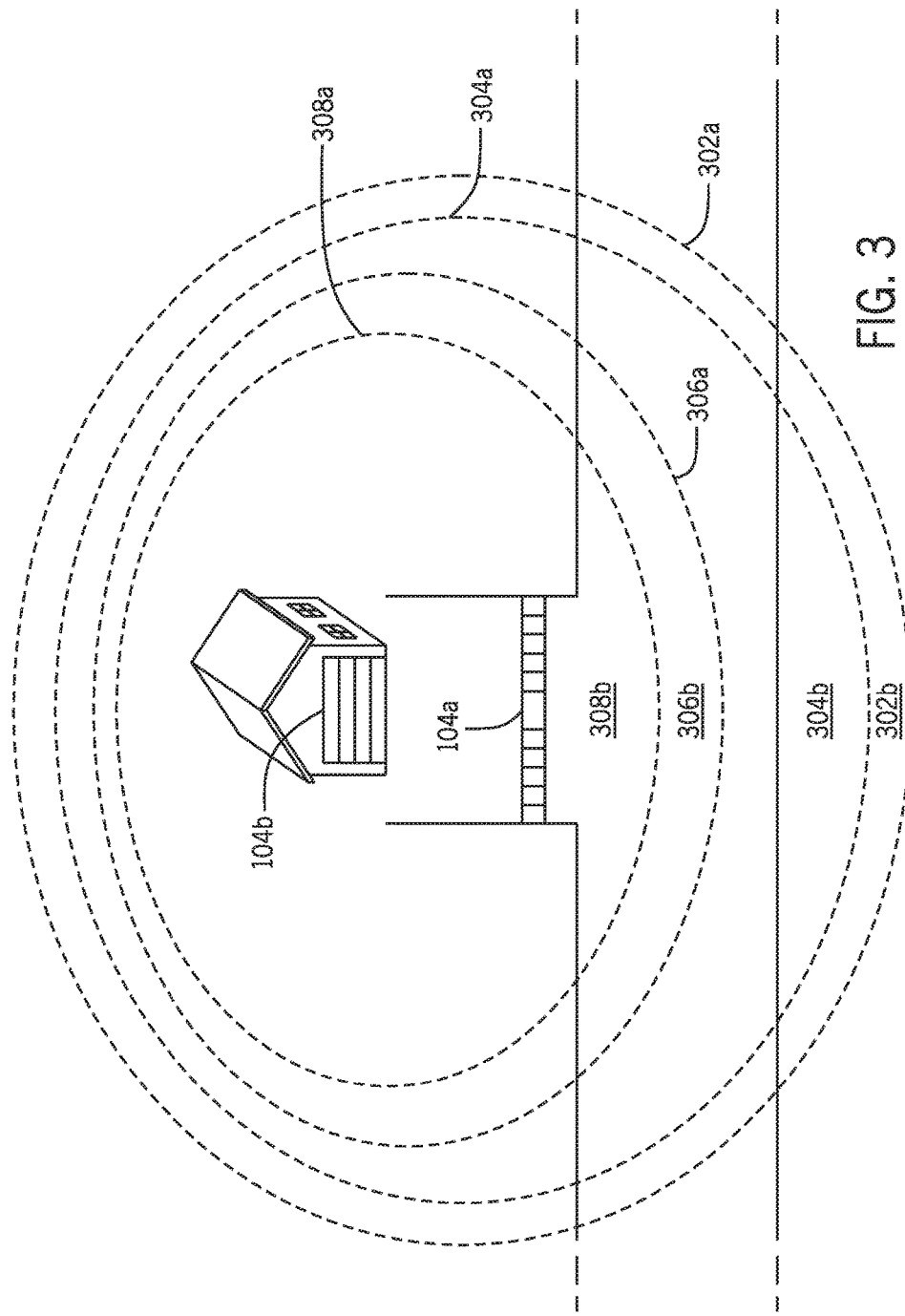
FIG. 3 is an illustrative example of a plurality of zones associated with the plurality of barriers as the vehicle arrives towards the plurality of barriers according to an exemplary embodiment.

FIG. 3 is an illustrative example of the plurality of zones associated with the plurality of barriers 104*a*, 104*b* as the vehicle 102 arrives towards the plurality of barriers 104*a*, 104*b* according to an exemplary embodiment. As shown in the illustrative example of FIG. 3, a boundary 302*a* of an arrival status zone 302*b* is determined and provided by the zone determinant module 132 and is associated with the barrier 104*a* that is configured as the entry/exit gate based on the stored geo-location of the barrier 104*a*. The arrival status zone 302*b* may be provided as an RF communication trigger point for the barrier signal control module 134 to utilize the vehicle communication system 126 to send the one or more status request signals to the transceiver 110*a* operably connected to the barrier controller 108*a* associated with the barrier 104*a* upon the vehicle passing the boundary 302*a* and entering the arrival status zone 302*b*.

As the vehicle 102 passes the boundary 302*a* associated with the arrival status zone 302*b*, the vehicle communication system 126 is configured to send the status request signal(s) that are interpreted by the barrier controller 108*a*. The barrier controller 108*a* may respond by operably controlling the transceiver 110*a* to send the barrier status response signal(s) to the vehicle communication system 126 to provide the current state of the barrier 104*a* (as the opened state, partially opened state, or closed state) to the application 106 as the vehicle 102 continues to travel through the arrival status zone 302*b*.

Upon the vehicle 102 continuing to arrive towards the barriers 104*a*, 104*b*, the vehicle 102 may enter an arrival status zone 304*b* associated with the barrier 104*b* that is configured as the garage door by passing a boundary 304*a* associated with the arrival status zone 304*b*. The boundary 304*a* may be utilized as a trigger point for the barrier signal control module 134 to utilize the vehicle communication system 126 to send the one or more barrier status request signals to the transceiver 110*b* operably connected to the barrier controller 108*b* associated with the barrier 104*b*.

Based on the querying of the storage unit 118 to determine the existence of the software flag (previously stored by the location determinant module 130) and the retrieval of the software flag from the storage unit 118, the barrier signal control module 134 may execute the dedicated software flow to ensure that the barrier status request signal(s) are not sent to the transceiver 110*b* upon the vehicle 102 entering the arrival status zone 304*b*.

In particular, the dedicated software flow may ensure that the barrier status request signal(s) are restricted from being sent to the transceiver 110*b* even as the vehicle 102 enters the arrival status zone 304*b* until the vehicle communication system 126 receives the barrier status response signal(s) from the transceiver 110*a* operably connected to the barrier controller 108*a*. Consequently, based on the determination of the existence of the software flag, the barrier control application 106 may avoid any potential interruption that may have been caused with respect to the vehicle communication system 126 receiving the barrier status response signal(s) from the transceiver 110*a* and the vehicle communication system 126 being utilized to send the status request signal(s) to the transceiver 110*b* simultaneously upon entering the arrival status zone 304*b*.

In one embodiment, following the dedicated software flow, upon the receipt of the barrier status response signal(s) from the transceiver 110*a* and the determination of the current state of the barrier 104*a*, the barrier signal control module 134 may operably control the vehicle communication system 126 to send one or more barrier status request signals to the transceiver 110*b* (if the vehicle 102 has passed the boundary 304*a*) operably connected to the barrier controller 108*b* associated with the barrier 104*b*. The barrier controller 108*b* may interpret the barrier status request signal(s) and may respond by operably controlling the transceiver 110*b* to send one or more barrier status response signals to the vehicle communication system 126 to provide the current state of the barrier 104*b* (as the opened state, partially opened state, or closed state) to the application 106 as the vehicle 102 continues to travel through the arrival status zone 304*b*.

Upon the vehicle 102 continuing to arrive towards the barriers 104*a*, 104*b*, the vehicle 102 may enter a barrier control zone 306*b* associated with the barrier 104*a* by passing a boundary 306*a* associated with the barrier control zone 306*b*. The boundary 306*a* may be utilized as a trigger point for the barrier signal control module 134 to utilize the vehicle communication system 126 to send one or more barrier control signals to the transceiver 110*a* operably connected to the barrier controller 108*a* to traverse the barrier 104*a* to the opened state if the barrier signal control module 134 previously determined that the current state of the barrier 104*a* is the closed state or the partially opened state (upon receiving the barrier status response signal(s) from the barrier controller 108*a*). In other words, upon the vehicle 102 entering the barrier control zone 306*b*, the barrier signal control module 134 may operably control the vehicle communication system 126 to send the barrier control signal(s) to the transceiver 110*a* to automatically traverse the barrier 104*a* to the opened state (if the current state of the barrier 104*a* is the closed state or the partially opened state).

In some scenarios, the vehicle 102 may enter the barrier control zone 306*b* prior to receiving the barrier status response signal(s) from the barrier controller 108*b* that is sent based on the receipt of the barrier status request signal(s) by the transceiver 110*b*. Based on the (earlier) retrieval of the software flag, the barrier signal control module 134 may continue to execute the dedicated software flow to ensure that the vehicle communication system 126 may be able to determine the current state of the barrier 104*b* despite the sending of the barrier control signal(s) to the transceiver 110*a* upon the vehicle 102 entering the barrier control zone 306*b*.

In particular, upon the vehicle 102 entering the barrier control zone 306*b* and the sending barrier control signal(s) by the vehicle communication system 126 to the transceiver 110*a*, the barrier signal control module 134 may subsequently utilize the vehicle communication system 126 to re-send the barrier status request signal(s) to the transceiver 110*b*. The barrier controller 108*b* may interpret the barrier status request signal(s) and may respond by operably controlling the transceiver 110*b* to send the barrier status response signal(s) to the vehicle communication system 126 to provide the current state of the barrier 104*b* (as the opened state, partially opened state, or closed state) to the application 106 as the vehicle 102 continues to travel through the barrier control zone 306*b*. Consequently, based on the determination of the existence of the software flag, the barrier control application 106 allows the determination of the current state of the barrier 104*b* despite the potential interruption that may have been caused with respect to the vehicle communication system 126 being utilized to send the barrier control signal(s) to the transceiver 110*a* simultaneously upon entering the barrier control zone 306*b*.

In one embodiment, upon reception of the barrier control signal(s) by the transceiver 110*a*, the barrier controller 108*a* may interpret the barrier control signal(s) and may respond by traversing the barrier 104*a* to the opened state. The barrier controller 108*a* may additionally operably control the transceiver 110*a* to send one or more barrier status update response signals to the vehicle communication system 126 to provide the updated state of the barrier 104*a* (as the opened state, partially opened state, or closed state) to the application 106.

Upon the vehicle 102 continuing to arrive towards the barriers 104*a*, 104*b*, the vehicle 102 may enter a barrier control zone 308*b* associated with the barrier 104*b* by passing a boundary 308*a* associated with the barrier control zone 308*b*. The boundary 308*a* may be utilized as a trigger point for the barrier signal control module 134 to utilize the vehicle communication system 126 to send one or more barrier control signals to the transceiver 110*b* operably connected to the barrier controller 108*b* to traverse the barrier 104*b* to the opened state if the barrier signal control module 134 previously determined that the current state of the barrier 104*b* is the closed state or the partially opened state (upon receiving the barrier status response signal(s) from the barrier controller 108*b*). In other words, upon the vehicle 102 entering the barrier control zone 308*b*, the barrier signal control module 134 may operably control the vehicle communication system 126 to send the barrier control signal(s) to the transceiver 110*b* (if the current state of the barrier 104*b* is the closed state or the partially opened state) operably connected to the barrier controller 108*b* associated with the barrier 104*b*.

In some scenarios, the vehicle 102 may enter the barrier control zone 308*b* prior to receiving the barrier status update response signal(s) from the barrier controller 108*a* that is sent by the transceiver 110*a* upon traversing of the barrier 104*a*. Based on the (earlier) retrieval of the software flag, the barrier signal control module 134 may continue to execute the dedicated software flow to ensure that the vehicle communication system 126 may be able to determine the updated state of the barrier 104*a* despite the sending of the barrier control signal(s) to the transceiver 110*b* upon the vehicle 102 entering the barrier control zone 308*b*.

In particular, upon the vehicle 102 entering the barrier control zone 308*b* and the sending the barrier control signal(s) by the vehicle communication system 126 to the transceiver 110*b*, the barrier signal control module 134 may subsequently utilize the vehicle communication system 126 to send one or more barrier status update request signals to the transceiver 110*a* to determine the updated state of the barrier 104*a*. The barrier controller 108*a* may interpret the barrier status update request signal(s) and may respond by operably controlling the transceiver 110*a* to send the barrier status update response signal(s) to the vehicle communication system 126 to provide the updated state of the barrier 104*a* (as the opened state, partially opened state, or closed state) to the application 106 as the vehicle 102 continues to travel through the barrier control zone 308*b*. Consequently, based on the determination of the existence of the software flag, the barrier control application 106 allows the determination of the updated state of the barrier 104*a* despite the potential interruption that may have been caused with respect to the vehicle communication system 126 being simultaneously utilized to send the barrier control signal(s) to the transceiver 110*b* upon entering the barrier control zone 308*b*.

In one embodiment, upon receipt of the barrier control signal(s) by the transceiver 110*b*, the barrier controller 108*b* may interpret the barrier control signal(s) and may respond by traversing the barrier 104*b* to the opened state. The barrier controller 108*b* may additionally operably control the transceiver 110*b* to send one or more barrier status update response signals to the vehicle communication system 126 to provide the updated state of the barrier 104*b* (as the opened state, partially opened state, or closed state) to the application 106.

In some scenarios, the utilization of the vehicle communication system 126 to receive the barrier status update response signal(s) to determine the updated state of the barrier 104*a* may interrupt the receipt of the barrier status update response signal(s) that are sent by the barrier controller 108*b* upon traversing the barrier 104*b*. Based on the (earlier) retrieval of the software flag, the barrier signal control module 134 may continue to execute the dedicated software flow to ensure that the vehicle communication system 126 may be able to determine the updated state of the barrier 104*b* despite the receipt of the barrier status update response signal(s) to subsequently determine the updated state of the barrier 104*b*.

In one embodiment, upon the receipt of the barrier status update response signal(s) from the transceiver 110*a*, pertaining to the updated state of the barrier 104*a*, the barrier signal control module 134 may subsequently utilize the vehicle communication system 126 to send one or more barrier status update request signals to the transceiver 110*b*. The barrier controller 108*b* may interpret the barrier status update request signal(s) and may respond by operably controlling the transceiver 110*b* to send the barrier status update response signal(s) to the vehicle communication system 126 to provide the updated state of the barrier 104*b* (as the opened state, partially opened state, or closed state) to the application 106 as the vehicle 102 continues to travel through the barrier control zone 308*b*. Consequently, based on the determination of the existence of the software flag, the barrier control application 106 allows the determination of the updated state of the barrier 104*b* despite the potential interruption that may have been caused with respect to the vehicle communication system 126 being simultaneously utilized to receive the barrier status update response signal(s) from the transceiver 110*a* upon the sending of the barrier status update response signal(s) by the transceiver 110*b* (in response to the barrier controller 108*b* receiving the barrier control signal(s) from the vehicle 102).

In an exemplary embodiment, upon receiving the barrier status update response signal(s) from the transceiver 110*a* and/or the transceiver 110*b*, the barrier signal control module 134 may communicate the updated state of the barrier 104*a* and/or the updated state of the barrier 104*b* to the barrier status presentation module 136. The barrier status presentation module 136 may utilize the display unit 116 of the vehicle 102 to present the barrier status user interface with a user interface graphic/text that presents the updated state of the barrier 104*a* and/or the updated state of the barrier 104*b* to the user. The barrier status user interface may allow the user to determine if the barrier 104*a* and/or the barrier 104*b* have autonomously traversed to the opened state as the vehicle 102 arrives towards the barriers 104*a*, 104*b*, based on the sending of the one or more barrier control signals to the respective transceivers 110*a*, 110*b*.

Figure 4:
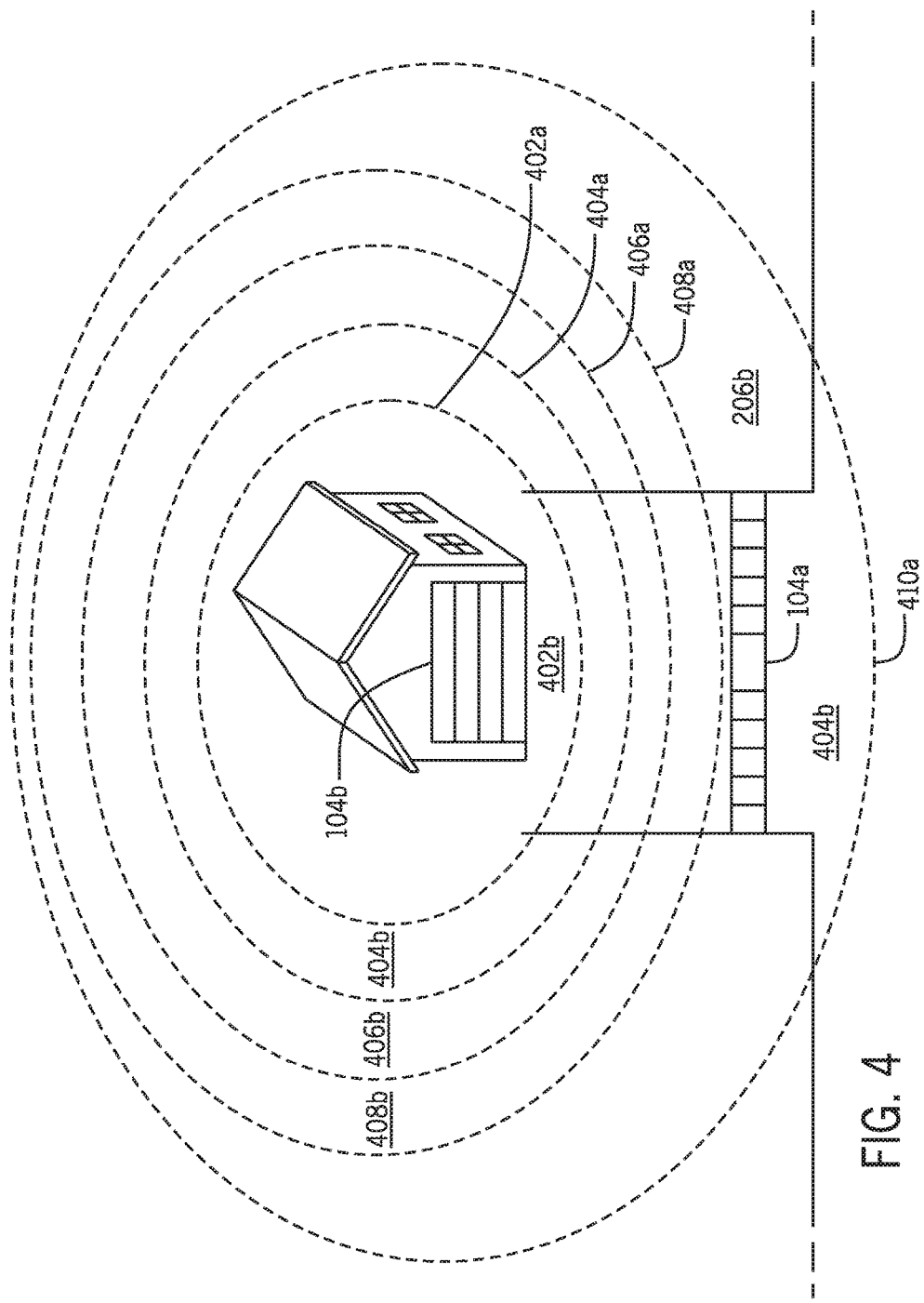
FIG. 4 is an illustrative example of a plurality of zones associated with the plurality of barriers as the vehicle departs away from the plurality of barriers according to an exemplary embodiment.

FIG. 4 is an illustrative example of the plurality of zones associated with the plurality of barriers 104*a*, 104*b* as the vehicle 102 departs away from the plurality of barriers 104*a*, 104*b* according to an exemplary embodiment. As shown in the illustrative example of FIG. 4, a boundary 402*a* of a departure status zone 402*b* is determined and provided by the zone determinant module 132 and is associated with the barrier 104*b* that is configured as the garage door based on the stored geo-location of the barrier 104*b*. The departure status zone 402*b* may be provided as an RF communication trigger point for the barrier signal control module 134 to utilize the vehicle communication system 126 to send one or more barrier status request signals to the transceiver 110*b* operably connected to the barrier controller 108*b* associated with the barrier 104*b* upon the vehicle 102 passing the boundary 402*a* and exiting the departure status zone 402*b* during departure of the vehicle 102 away from the barrier 104*b* (as the vehicle 102 travels towards the barrier 104*a*).

As the vehicle 102 passes the boundary 402*a* associated with the departure status zone 402*b*, the vehicle communication system 126 is configured to send the status request signal(s) that are interpreted by the barrier controller 108*b*. The barrier controller 108*b* may respond by operably controlling the transceiver 110*b* to send a barrier status response signal(s) to the vehicle communication system 126 to provide the current state of the barrier 104*b* (as the opened state, partially opened state, or closed state) to the application 106 as the vehicle 102 continues to travel through the departure status zone 402*b*.

Upon the vehicle 102 continuing to depart away from the barrier 104*b*, the vehicle 102 may exit the departure status zone 402*b* and continue to travel through and exit a departure status zone 404*b* associated with the barrier 104*a* by passing a boundary 404*a* associated with the departure status zone 404*b*. The boundary 404*a* may be utilized as a trigger point for the barrier signal control module 134 to utilize the vehicle communication system 126 to send the one or more barrier status request signals to the transceiver 110*a* operably connected to the barrier controller 108*a* associated with the barrier 104*a*.

Based on the querying of the storage unit 118 to determine the existence of the software flag (previously stored by the location determinant module 130) and the retrieval of the software flag from the storage unit 118, the barrier signal control module 134 may execute the dedicated software flow to ensure that the barrier status request signal(s) are not sent to the transceiver 110*a* upon the vehicle 102 exiting the departure status zone 404*b*.

In particular, the execution of the dedicated software flow may ensure that the barrier status request signal(s) are restricted from being sent to the transceiver 110*a* even as the vehicle 102 exits the departure status zone 404*b* until the vehicle communication system 126 receives the barrier status response signal(s) from the transceiver 110*b* operably connected to the barrier controller 108*b*. Consequently, based on the determination of the existence of the software flag, the barrier control application 106 may avoid any potential interruption that may have been caused with respect to the vehicle communication system 126 receiving the barrier status response signals that are sent by the transceiver 110*b* and the vehicle communication system 126 being utilized to send the status request signal(s) to the transceiver 110*a* simultaneously upon the vehicle 102 exiting the departure status zone 404*b*.

In one embodiment, following the dedicated software flow, upon the receipt of the barrier status response signal(s) from the transceiver 110*b* and the determination of the current state of the barrier 104*b*, the barrier signal control module 134 may operably control the vehicle communication system 126 to send the barrier status request signal(s) to the transceiver 110*a* (if the vehicle 102 has passed the boundary 404*a*) operably connected to the barrier controller 108*a* associated with the barrier 104*a*. The barrier controller 108*a* may interpret the barrier status request signal(s) and may respond by operably controlling the transceiver 110*a* to send one or more barrier status response signals to the vehicle communication system 126 to provide the current state of the barrier 104*a* (as the opened state, partially opened state, or closed state) to the application 106 as the vehicle 102 travels away from the barrier 104b and towards the barrier 104a. The determination of the current state of the barrier 104a may ensure that the barrier 104a is or is not in a closed state that may restrict the vehicle 102 from exiting a location (e.g., a driveway between the barrier 104a and the barrier 104b) enclosed by the barrier 104a during departure of the vehicle 102.

Upon the vehicle 102 continuing to depart away from the barrier 104b, the vehicle 102 may enter and exit a barrier control zone 406b associated with the barrier 104b by passing a boundary 406a associated with the barrier control zone 406b. The boundary 406a may be utilized as a trigger point for the barrier signal control module 134 to utilize the vehicle communication system 126 to send the barrier control signal(s) to the transceiver 110b to traverse the barrier 104b to the closed state if the barrier signal control module 134 previously determined that the current state of the barrier 104b is the opened state or the partially opened state (upon receiving the barrier status response signal(s) from the barrier controller 108b). In other words, upon the vehicle 102 exiting the barrier control zone 406b, the barrier signal control module 134 may operably control the vehicle communication system 126 to send one or more barrier control signals to the transceiver 110b (if the current state of the barrier 104b is the opened state or the partially opened state) to traverse the barrier 104a to the closed state.

In some scenarios, the vehicle 102 may exit the barrier control zone 406b prior to receiving the barrier status response signal(s) from the barrier controller 108a that is sent based on the receipt of the barrier status request signal(s) by the transceiver 110a. Based on the (earlier) retrieval of the software flag, the barrier signal control module 134 may continue to execute the dedicated software flow to ensure that the vehicle communication system 126 may be able to determine the current state of the barrier 104a despite the sending of the barrier control signal(s) to the transceiver 110b upon the vehicle 102 exiting the barrier control zone 406b.

In particular, upon the vehicle 102 exiting the barrier control zone 406b and the sending the barrier control signal(s) by the vehicle communication system 126 to the transceiver 110b to traverse the barrier 104b to the closed state, the barrier signal control module 134 may subsequently utilize the vehicle communication system 126 to re-send the barrier status request signal(s) to the transceiver 110a. The barrier controller 108a may interpret the barrier status request signal(s) and may respond by operably controlling the transceiver 110a to send the barrier status response signal(s) to the vehicle communication system 126 to provide the current state of the barrier 104a (as the opened state, partially opened state, or closed state) to the application 106 as the vehicle 102 continues to travel through the barrier control zone 406b towards the barrier 104a.

As stated, this determination may provide the application 106 the ability to determine if the barrier 104a is in the closed state and needs to be traversed to the opened state to allow the vehicle 102 to exit the location enclosed by the barrier 104a. Consequently, based on the determination of the existence of the software flag, the barrier control application 106 allows the determination of the current state of the barrier 104a despite the potential interruption that may have been caused with respect to the vehicle communication system 126 being simultaneously utilized to send the barrier control signal(s) to the transceiver 110b upon the vehicle 102 exiting the barrier control zone 406b.

Upon receipt of the barrier control signal(s) by the transceiver 110b, the barrier controller 108a may interpret the barrier control signal(s) and may respond by traversing the barrier 104b to the closed state as the vehicle 102 departs away from the barrier 104b. The barrier controller 108b may additionally operably control the transceiver 110b to send a barrier status update response signal(s) to the vehicle communication system 126 to provide the updated state of the barrier 104b (as the opened state, partially opened state, or closed state) to the application 106.

Upon the vehicle 102 continuing to depart away from the barrier 104b and toward the barrier 104a, the vehicle 102 may travel through and exit a barrier control zone 408b associated with the barrier 104a by passing a boundary 408a associated with the barrier control zone 308b. The boundary 408a may be utilized as a trigger point for the barrier signal control module 134 to utilize the vehicle communication system 126 to send one or more barrier control signals to the transceiver 110a operably connected to the barrier controller 108a associated with the barrier 104a to traverse the barrier 104a to the opened state if the barrier signal control module 134 previously determined that the current state of the barrier 104b is the closed state or the partially opened state (upon receiving the barrier status response signal(s) from the barrier controller 108a). In other words, upon the vehicle 102 exiting the barrier control zone 408b, the barrier signal control module 134 may operably control the vehicle communication system 126 to send the barrier control signal(s) to the transceiver 110a (if the current state of the barrier 104b is the closed state or the partially opened state) operably connected to the barrier controller 108a associated with the barrier 104a.

In some scenarios, the vehicle 102 may travel through and exit the barrier control zone 408b prior to receiving the barrier status update response signal(s) from the barrier controller 108b that is sent by the transceiver 110b upon traversing of the barrier 104b. Based on the (earlier) retrieval of the software flag, the barrier signal control module 134 may continue to execute the dedicated software flow to ensure that the vehicle communication system 126 may be able to determine the updated state of the barrier 104b despite the sending of the barrier control signal(s) to the transceiver 110a upon the vehicle 102 exiting the barrier control zone 408b.

In particular, upon the vehicle 102 exiting the barrier control zone 408b and the sending of the barrier control signal(s) by the vehicle communication system 126 to the transceiver 110a, the barrier signal control module 134 may subsequently utilize the vehicle communication system 126 to send one or more barrier status update request signals to the transceiver 110b. The barrier controller 108b may interpret the barrier status update request signal(s) and may respond by operably controlling the transceiver 110b to send the barrier status update response signal(s) to the vehicle communication system 126 to provide the updated state of the barrier 104b (as the opened state, partially opened state, or closed state) to the application 106 as the vehicle 102 continues to depart away from the barrier 104b. Consequently, based on the determination of the existence of the software flag, the barrier control application 106 allows the determination of the updated state of the barrier 104b despite the potential interruption that may have been caused with respect to the vehicle communication system 126 being simultaneously utilized to send the barrier control signal(s) to the transceiver 110a upon the vehicle 102 exiting the barrier control zone 408b.

Upon the receipt of the barrier control signal(s) by the transceiver 110a, the barrier controller 108b may interpret the barrier control signal(s) and may respond by traversing the barrier 104a to the opened state to allow the vehicle 102 to exit the location enclosed by the barrier 104a. The barrier controller 108b may additionally operably control the transceiver 110a to send one or more barrier status update response signals to the vehicle communication system 126 to provide the updated state of the barrier 104a (as the opened state, partially opened state, or closed state) to the application 106.

In some scenarios, the utilization of the vehicle communication system 126 to receive the barrier status update response signal(s) to determine the updated state of the barrier 104b may interrupt the receipt of the barrier status update response signal(s) that are sent by the barrier controller 108a upon traversing the barrier 104a. Based on the (earlier) retrieval of the software flag, the barrier signal control module 134 may continue to execute the dedicated software flow to ensure that the vehicle communication system 126 may be able to determine the updated state of the barrier 104a.

In one embodiment, upon the receipt of the barrier status update response signal(s) from the transceiver 110b pertaining to the updated state of the barrier 104b, the barrier signal control module 134 may subsequently utilize the vehicle communication system 126 to send one or more barrier status update request signals to the transceiver 110a. The barrier controller 108b may interpret the barrier status update request signal(s) and may respond by operably controlling the transceiver 110a to send the barrier status update response signal(s) to the vehicle communication system 126 to provide the updated state of the barrier 104a (as the opened state, partially opened state, or closed state) to the application 106 as the vehicle 102 continues to travel toward the barrier 104a to exit the location enclosed by the barrier 104a. Consequently, based on the determination of the existence of the software flag, the barrier control application 106 allows the determination of the updated state of the barrier 104a despite the potential interruption that may have been caused with respect to the vehicle communication system 126 being simultaneously utilized to receive the barrier status update response signal(s) from the transceiver 110b upon the sending of the barrier status update response signal(s) by the transceiver 110a.

In an exemplary embodiment, as the vehicle 102 continues to depart away from the barrier 104b and passes the barrier 104a in the opened state, the vehicle 102 may travel through and exit an external barrier control zone 410b associated with the barrier 104a by passing a boundary 410a associated with the external barrier control zone 410b. The boundary 410a may be utilized as a trigger point for the barrier signal control module 134 to utilize the vehicle communication system 126 to send one or more barrier control signals to the transceiver 110a to traverse the barrier 104a to the closed state if the barrier signal control module 134 previously determined that the updated state of the barrier 104a is the opened state or the partially opened state (upon receiving the barrier status update response signal(s) from the barrier controller 108a).

In one embodiment, upon the vehicle 102 departing away from the barrier 104a and exiting the external barrier control zone 410b, the barrier signal control module 134 may operably control the vehicle communication system 126 to send the barrier control signal(s) to the transceiver 110a operably connected to the barrier controller 108a. The barrier controller 108a may interpret the barrier control signal(s) and may respond by traversing the barrier 104a to the closed state as the vehicle 102 departs away from the barrier 104a to thereby close the barrier 104a (entry/exit gate). The barrier controller 108a may additionally operably control the transceiver 110a to send one or more barrier status update response signals to the vehicle communication system 126 to provide the updated state of the barrier 104a (as the opened state, partially opened state, or closed state) to the application 106 to the provide the user the updated state of the barrier 104a as the vehicle 102 continues to travel away from the barriers 104a, 104b.

In an exemplary embodiment, upon receiving the one or more barrier status update response signals from the transceiver 110a and/or the transceiver 110b, the barrier signal control module 134 may communicate the updated state of the barrier 104a and/or the updated state of the barrier 104b to the barrier status presentation module 136. The barrier status presentation module 136 may utilize the display unit 116 of the vehicle 102 to present the barrier status user interface with the user interface graphic/text that presents the updated state of the barrier 104a and/or the updated state of the barrier 104b to the user to allow the user to determine if the barrier 104a and/or the barrier 104b have autonomously traversed to the opened or closed state based on the sending of the one or more barrier control signals to the respective transceivers 110a, 110b as the vehicle 102 exits the barrier control zones 406b, 408b, and/or the external barrier control zone 410b.

III. Exemplary Methods Executed by the Barrier Movement Control Application

Figure 5:
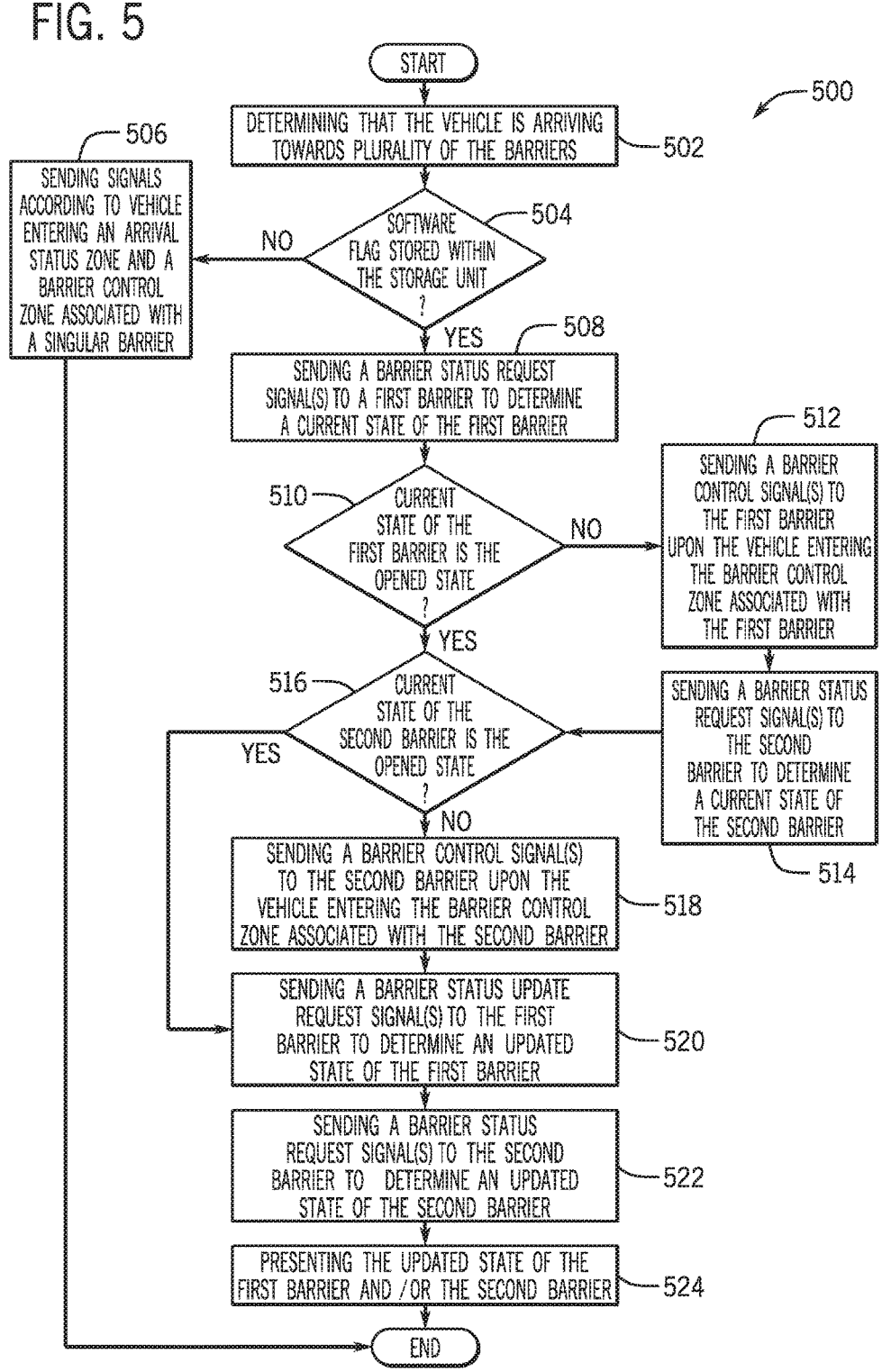
FIG. 5 is a process flow diagram of a method for managing autonomous operation of the plurality of barriers when the vehicle is determined to be arriving towards the plurality of barriers according to an exemplary embodiment.

FIG. 5 is a process flow diagram of a method 500 for managing autonomous operation of the plurality of barriers 104a, 104b when the vehicle 102 is determined to be arriving towards the plurality of barriers 104a, 104b according to an exemplary embodiment. FIG. 5 will be described with reference to the components of FIG. 1 though it is to be appreciated that the method 500 of FIG. 5 may be used with other systems and/or components. Additionally, the method 500 of FIG. 5 will be described with reference to the illustrative example of FIG. 3. The method 500 may begin at block 502, wherein the method 500 may include determining that the vehicle 102 is arriving towards the plurality of barriers 104a, 104b. As discussed, the location determinant module 130 may determine that the vehicle 102 is arriving towards the plurality of barriers 104a, 104b if the navigation system 128 determines that a distance between the locational coordinates of the vehicle 102 and the respective geo-locations of the plurality of barriers 104a, 104b is decreasing.

The method 500 may proceed to block 504, wherein the method 500 may include determining if a software flag is stored within the storage unit 118. In an exemplary embodiment, upon determining that the vehicle 102 is arriving towards the barriers 104a, 104b, the location determinant module 130 may communicate respective data to the zone determinant module 132. The zone determinant module 132 may query the storage unit 118 of the vehicle 102 to determine the existence of the software flag (previously stored by the location determinant module 130). Based on querying of the storage unit 118, the zone determinant module 132 may determine if the software flag is or is not stored on the storage unit 118.

If it is determined that the software flag is not stored on the storage unit 118, the method 500 may proceed to block 506, wherein the method 500 may include sending signals according to the vehicle 102 entering an arrival status zone and a barrier control zone associated with a single barrier (not shown) (e.g., a single garage door at a residence). In one embodiment, when the zone determinant module 132 determines that the software flag is not stored on the storage unit 118, the zone determinant module 132 may communicate with the location determinant module 130 to receive the location and traveling direction of the vehicle 102.

The zone determinant module 132 may then determine an arrival status zone and a barrier control zone associated with the single barrier. The arrival status zone and barrier control zone may be utilized to determine the current state of the barrier and to traverse the barrier to the opened state as the vehicle 102 arrives towards the single barrier. In some embodiments, the vehicle communication system 126 may receive one or more barrier status update response signals from a barrier controller (not shown) of the single barrier. The barrier signal control module 134 may interpret the barrier status update response signal(s) to determine an updated state of the single barrier and may communicate with the barrier status presentation module 136 to present the updated state of the single barrier to the user via the barrier status user interface.

If it is determined that the software flag is stored on the storage unit 118, the method 500 may proceed to block 508, wherein the method 500 may include sending a barrier status request signal(s) to a first barrier 104a to determine a current state of the first barrier 104a. Upon determining the existence of the software flag and the retrieval of the software flag from the storage unit 118, the barrier signal control module 134 may ensure that a dedicated software flow is utilized to ensure that there is no interruption of signals being sent and received between the vehicle communication system 126 and the transceivers 110a, 110b.

In one embodiment, when the zone determinant module 132 determines the existence of the software flag, the zone determinant module 132 may communicate with the location determinant module 130 to determine the location of the vehicle 102 and the traveling direction of the vehicle 102. The zone determinant module 132 may determine the arrival status zones 302b, 304b and the barrier control zones 306b, 308b respectively associated with the barriers 104a, 104b to be utilized to determine the current state of the respective barriers 104a, 104b and to traverse the respective barriers 104a, 104b to the opened state as the vehicle 102 arrives towards the respective barriers 104a, 104b.

In an exemplary embodiment, when the vehicle 102 is determined to enter the arrival status zone 302b associated with the barrier 104a, the location determinant module 130 may communicate respective data to the barrier signal control module 134. The barrier signal control module 134 may operably control the vehicle communication system 126 to send the barrier status request signal(s) to the transceiver 110a to be interpreted by the barrier controller 108a.

The method 500 may proceed to block 510, wherein the method 500 may include determining if the current state of the first barrier 104a is the opened state. In an exemplary embodiment, upon the transceiver 110a receiving the barrier status request signal(s), the barrier controller 108a may utilize the transceiver 110a to send the one or more barrier status response signals to the vehicle communication system 126 that indicate the current state of the barrier 104a as the opened state, the closed state, or the partially opened state. Upon receipt of the barrier status request signal(s) by the vehicle communication system 126, the barrier signal control module 134 may analyze the barrier status request signal(s) and may determine if the current state of the barrier 104a is the opened state.

If it is determined that the current state of the barrier 104a is not the opened state (at block 510), the method 500 may proceed to block 512, wherein the method 500 may include sending a barrier control signal(s) to the first barrier 104a upon the vehicle 102 entering the barrier control zone 306b associated with the first barrier 104a. In an exemplary embodiment, upon determining that the barrier 104a is in the closed state or the partially opened state, the barrier signal control module 134 may communicate with the location determinant module 130 to determine the location of the vehicle 102. The location determinant module 130 may communicate the determination that the vehicle 102 enters the barrier control zone 306b. Upon determining that the vehicle 102 enters the barrier control zone 306b, the barrier signal control module 134 may send the barrier control signal(s) to the transceiver 110a operably connected to the barrier controller 108 to traverse the barrier 104a to the opened state.

The method 500 may proceed to block 514, wherein the method 500 may include sending a barrier status request signal(s) to the second barrier 104b to determine a current state of the second barrier 104b. As discussed above, upon the vehicle 102 entering the arrival status zone 304b, the vehicle communication system 126 may send the barrier status request signal(s) to the transceiver 110b to determine the current state of the barrier 104b. However, in some scenarios, the vehicle 102 may enter the barrier control zone 306b prior to receiving the barrier status response signal(s) from the barrier controller 108b that is sent based on the receipt of the barrier status request signal(s) by the transceiver 110b.

The application 106 may ensure that the current state of the barrier 104b is determined based on the barrier signal control module 134 utilizing the vehicle communication system 126 to send the barrier status request signal(s) to the transceiver 110b upon the sending of the barrier control signal(s) to the first barrier 104a (at block 512). Consequently, based on the determination of the existence of the software flag (at block 504), the barrier control application 106 allows the determination of the current state of the barrier 104b despite the potential interruption that may have been caused with respect to the vehicle communication system 126 simultaneously being utilized to send the barrier control signal(s) to the transceiver 110a upon the vehicle 102 entering the barrier control zone 306b.

In an alternate embodiment, the barrier signal control module 134 may utilize the vehicle communication system 126 to send the barrier status request signal(s) if it is determined that the vehicle 102 has entered the barrier control zone 306b before receiving the barrier status response signal(s) from the barrier controller 108b. In other words, the barrier signal control module 134 may control the sending of the barrier status request signal(s) upon the entrance of the vehicle 102 to the barrier control zone 306b if the current state of the barrier 104b is not determined while the vehicle 102 is traveling within the arrival status zone 304b. Consequently, within the alternate embodiment, if the vehicle communication system 126 receives the barrier status response signal(s) indicating the current state of the barrier 104a before the vehicle 102 enters the barrier control zone 306b, the barrier signal control module 134 may send the barrier status request signal(s) to the second barrier 104b before sending the barrier control signal(s) to the first barrier 104*a* rather than after sending the barrier control signal(s), as indicated within the method 500.

The method 500 may proceed to block 516 wherein the method 500 may include determining if the current state of the second barrier 104*b* is the opened state. In an exemplary embodiment, upon the transceiver 110*b* receiving the barrier status request signal(s), the barrier controller 108*b* may utilize the transceiver 110*b* to send the barrier status response signal(s) to the vehicle communication system 126 that indicate the current state of the barrier 104*b* as the opened state, the closed state, or the partially opened state. Upon receipt of the barrier status request signal(s) by the vehicle communication system 126, the barrier signal control module 134 may analyze the barrier status request signal(s) and may determine if the current state of the barrier 104*b* is the opened state.

If it is determined that the current state of the barrier 104*b* is not the opened state (at block 516), the method 500 may proceed to block 518, wherein the method 500 may include sending a barrier control signal(s) to the second barrier 104*b* upon the vehicle 102 entering the barrier control zone 308*b* associated with the second barrier 104*b*. In an exemplary embodiment, upon determining that the barrier 104*b* is in the closed state or the partially opened state, the barrier signal control module 134 may communicate with the location determinant module 130 to determine the location of the vehicle 102. The location determinant module 130 may communicate the determination that the vehicle 102 enters the barrier control zone 308*b*. Upon determining that the vehicle 102 enters the barrier control zone 308*b*, the barrier signal control module 134 may send the barrier control signal(s) to the transceiver 110*a* operably connected to the barrier controller 108 to traverse the barrier 104*b* to the opened state.

The method 500 may proceed to block 520, wherein the method 500 may include sending a barrier status update request signal(s) to the first barrier 104*a* to determine an updated state of the first barrier 104*a*. As discussed above, upon the transceiver 110*a* receiving the barrier control signal(s) from the vehicle communication system 126, the barrier controller 108*a* may operably control the transceiver 110*a* to send the barrier status update response signal(s) to the vehicle communication system 126, to provide the updated state of the barrier 104*a*. However, in some scenarios, the vehicle 102 may enter the barrier control zone 308*b* prior to receiving the barrier status update response signal(s) from the barrier controller 108*a*.

The application 106 may ensure that the updated state of the barrier 104*a* is determined based on the barrier signal control module 134 utilizing the vehicle communication system 126 to send the barrier status update request signal(s) to the transceiver 110*a* upon the sending of the barrier control signal(s) to the second barrier 104*b* (at block 518). Consequently, based on the determination of the existence of the software flag (at block 504), the barrier control application 106 allows the determination of the updated state of the barrier 104*a* despite the potential interruption that may have been caused with respect to the vehicle communication system 126 simultaneously being utilized to send the barrier control signal(s) to the transceiver 110*b* upon the vehicle 102 entering the barrier control zone 308*b*.

In an alternate embodiment, the barrier signal control module 134 may utilize the vehicle communication system 126 to send the barrier status update request signal(s) if it is determined that the vehicle 102 has entered the barrier control zone 308*b* before receiving the barrier status update response signal(s) from the barrier controller 108*a*. In other words, the barrier signal control module 134 may control the sending of the barrier status update request signal(s) upon the entrance of the vehicle 102 to the barrier control zone 308*b* if the current state of the barrier 104*a* is not determined while the vehicle 102 is traveling within the barrier control zone 306*b*. Consequently, within the alternate embodiment, if the vehicle communication system 126 receives the barrier status update response signal(s) indicating the updated state of the barrier 104*a* before the vehicle 102 enters the barrier control zone 308*b*, the barrier signal control module 134 may not send the barrier status update request signal(s) to the first barrier 104*a* rather than sending the barrier status update request signal(s) after sending the barrier control signal(s), as indicated within the method 500.

The method 500 may proceed to block 522, wherein the method 500 may include sending a barrier status request signal(s) to the second barrier 104*b* to determine an updated state of the second barrier 104*b*. As discussed above, in some scenarios, the reception of the barrier status update response signal(s) from the barrier controller 108*a* to provide the updated state of the barrier 104*a* may interrupt the reception of the barrier status update response signal(s) that may be sent from the transceiver 110*b* upon receiving of the barrier control signal(s) to traverse the barrier 104*b*.

The application 106 may ensure that the updated state of the barrier 104*b* is determined based on the barrier signal control module 134 utilizing the vehicle communication system 126 to send the barrier status update request signal(s) to the transceiver 110*b* upon the sending the barrier status update request signal(s) and receiving the barrier status update response signal(s) to and from the transceiver 110*a*. Consequently, based on the determination of the existence of the software flag (at block 504), the barrier control application 106 allows the determination of the updated state of the barrier 104*b* despite the potential interruption that may have been caused with respect to the vehicle communication system 126 simultaneously being utilized to receive the barrier status update response signal(s) from the transceiver 110*a* upon the vehicle 102 entering the barrier control zone 308*b*.

In an alternate embodiment, if the vehicle communication system 126 receives the barrier status update response signal(s) indicating the updated state of the barrier 104*a* before the vehicle 102 enters the barrier control zone 308*b*, the barrier signal control module 134 may receive the barrier status update response signal(s) from the transceiver 110*a* upon the sending of the barrier control signal(s) to traverse the barrier 104*a*. In other words, since there may not be any potential interruption with respect to the reception of the barrier status update response signal(s) by the vehicle communication system 126, the barrier signal control module 134 may not utilize the vehicle communication system 126 to send the barrier status request signal(s) to determine the state of the barrier 104*b*, as indicated within the method 500.

The method 500 may proceed to block 524, wherein the method 500 may include presenting the updated state of the first barrier 104*a* and/or the second barrier 104*b*. In an exemplary embodiment, upon the vehicle communication system 126 receiving the barrier status update response signal(s) from the respective transceivers 110*a*, 110*b*, the barrier signal control module 134 may analyze the received signals and determine the updated states of the respective barriers 104*a*, 104*b*. The barrier signal control module 134 may communicate the updated states of the respective barriers 104*a*, 104*b* to the barrier status presentation module 136. The barrier status presentation module 136 may utilize the display unit 116 of the vehicle 102 to present the barrier status user interface with the user interface graphic/text that presents the updated state of the barrier 104a and/or the updated state of the barrier 104b to the user to allow the user to determine if the barrier 104a and/or the barrier 104b have autonomously traversed to the opened state based on the sending of the barrier control signal(s) to the respective transceivers 110a, 110b as the vehicle 102 entered the barrier control zones 306b, 308b.

Figure 6:
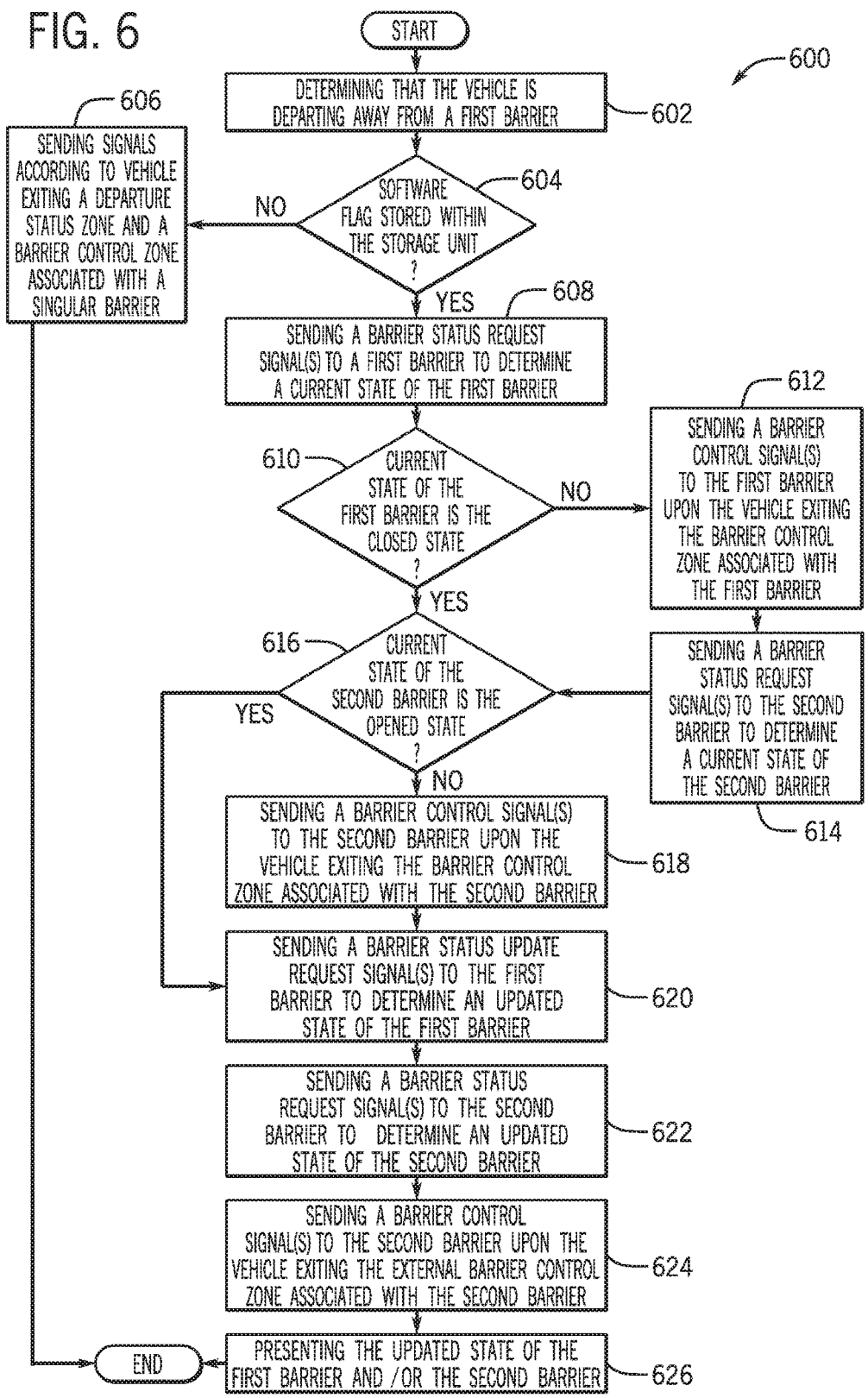
FIG. 6 is a process flow diagram of a method for managing autonomous operation of the plurality of barriers when the vehicle is determined to be departing away from the plurality of barriers according to an exemplary embodiment.

FIG. 6 is a process flow diagram of a method 600 for managing autonomous operation of the plurality of barriers 104a, 104b when the vehicle 102 is determined to be departing away from the plurality of barriers 104a, 104b according to an exemplary embodiment. FIG. 6 will be described with reference to the components of FIG. 1 though it is to be appreciated that the method 600 of FIG. 6 may be used with other systems and/or components. Additionally, the method 600 of FIG. 6 will be described with reference to the illustrative example of FIG. 4. The method 600 may begin at block 602, wherein the method 600 may include determining that the vehicle 102 is departing away from a first barrier 104b. In one embodiment, the location determinant module 130 may determine that the vehicle 102 is departing away from the barrier 104b (e.g., garage door) if the navigation system 128 determines that a distance between the locational coordinates of the vehicle 102, as provided by the GPS 128a, and the geo-location of the barrier 104b is increasing.

The method 600 may proceed to block 604, wherein the method 600 may include determining if a software flag is stored within the storage unit 118. In an exemplary embodiment, upon determining that the vehicle 102 is departing away from the barrier 104b, the location determinant module 130 may communicate respective data to the zone determinant module 132. The zone determinant module 132 may query the storage unit 118 of the vehicle 102 to determine the existence of the software flag (previously stored by the location determinant module 130). Based on querying of the storage unit 118, the zone determinant module 132 may determine if the software flag is or is not stored on the storage unit 118.

If it is determined that the software flag is not stored on the storage unit 118, the method 600 may proceed to block 606, wherein the method 600 may include sending signals according to the vehicle 102 exiting a departure status zone and a barrier control zone associated with a single barrier (not shown) (e.g., a single garage door at a residence). In one embodiment, when the zone determinant module 132 determines that the software flag is not stored on the storage unit 118, the zone determinant module 132 may communicate with the location determinant module 130 to receive the location and traveling direction of the vehicle 102.

The zone determinant module 132 may then determine a departure status zone and a barrier control zone associated with the single barrier. The departure status zone and barrier control zone may be utilized to determine the current state of the barrier and to traverse the barrier to the closed state as the vehicle 102 departs away from the single barrier. In some embodiments, the vehicle communication system 126 may receive one or more barrier status update response signals from a barrier controller (not shown) of the single barrier. The barrier signal control module 134 may interpret the barrier status update response signal(s) to determine an updated state of the single barrier and may communicate with the barrier status presentation module 136 to present the updated state of the single barrier to the user via the barrier status user interface.

If it is determined that the software flag is stored on the storage unit 118, the method 600 may proceed to block 608, wherein the method 600 may include sending a barrier status request signal(s) to a first barrier 104b to determine a current state of the first barrier 104b. Upon determining the existence of the software flag and the retrieval of the software flag from the storage unit 118, the barrier signal control module 134 may ensure that a dedicated software flow is utilized to ensure that there is no interruption of signals being sent and received between the vehicle communication system 126 and the transceivers 110a, 110b.

In one embodiment, when the zone determinant module 132 determines the existence of the software flag, the zone determinant module 132 may communicate with the location determinant module 130 to determine the location of the vehicle 102 and the traveling direction of the vehicle 102. The zone determinant module 132 may determine the departure status zones 402b, 404b and the barrier control zones 406b, 408b respectively associated with the barriers 104a, 104b to be utilized to determine the current state of the respective barriers 104a, 104b and to traverse the barriers 104a, 104b to the closed state as the vehicle 102 departs away from the barriers 104a, 104b.

The method 600 may proceed to block 610, wherein the method 600 may include determining if the current state of the first barrier 104b is the closed state. In an exemplary embodiment, upon the transceiver 110b receiving the barrier status request signal(s), the barrier controller 108b may utilize the transceiver 110b to send the barrier status response signal(s) to the vehicle communication system 126 that indicate the current state of the barrier 104b as the opened state, the closed state, or the partially opened state. Upon receipt of the barrier status request signal(s) by the vehicle communication system 126, the barrier signal control module 134 may analyze the barrier status request signal(s) and may determine if the current state of the barrier 104b is the closed state.

If it is determined that the current state of the barrier 104b is not the closed state (at block 610), the method 600 may proceed to block 612, wherein the method 600 may include sending a barrier control signal(s) to the first barrier 104b upon the vehicle 102 exiting the barrier control zone 406b associated with the first barrier 104b. In an exemplary embodiment, upon determining that the barrier 104b is in the opened state or the partially opened state, the barrier signal control module 134 may communicate with the location determinant module 130 to determine the location of the vehicle 102. The location determinant module 130 may communicate when it is determined that the vehicle 102 travels through and exits the barrier control zone 406b. Upon determining that the vehicle 102 exits the barrier control zone 406b, the barrier signal control module 134 may send the barrier control signal(s) to the transceiver 110a operably connected to the barrier controller 108 to traverse the barrier 104b to the closed state.

The method 600 may proceed to block 614, wherein the method 600 may include sending a barrier status request signal(s) to the second barrier 104a to determine a current state of the second barrier 104a. As discussed above, upon the vehicle 102 exiting the departure status zone 404b, the vehicle communication system 126 may send the barrier status request signal(s) to the transceiver 110a to determine the current state of the barrier 104a. However, in some scenarios, the vehicle 102 may exit the barrier control zone 406b prior to receiving the barrier status response signal(s)

from the barrier controller 108*a* that is sent based on the reception of barrier status request signal(s) by the transceiver 110*a*.

The application 106 may ensure that the current state of the barrier 104*a* is determined based on the barrier signal control module 134 utilizing the vehicle communication system 126 to send the barrier status request signal(s) to the transceiver 110*a* upon the sending of the barrier control signal(s) to the first barrier 104*b* (at block 612). Consequently, based on the determination of the existence of the software flag (at block 604), the barrier control application 106 allows the determination of the current state of the barrier 104*a* despite the potential interruption that may have been caused with respect to the vehicle communication system 126 simultaneously being utilized to send the barrier control signal(s) to the transceiver 110*b* upon the vehicle 102 exiting the barrier control zone 406*b*.

In an alternate embodiment, the barrier signal control module 134 may utilize the vehicle communication system 126 to send the barrier status request signal(s) if it is determined that the vehicle 102 has exited the barrier control zone 406*b* before receiving the barrier status response signal(s) from the barrier controller 108*a*. In other words, the barrier signal control module 134 may control the sending of the barrier status request signal(s) upon the exiting of the vehicle 102 from the barrier control zone 406*b* if the current state of the barrier 104*a* is not determined while the vehicle 102 is traveling within the barrier control zone 406*b*. Consequently, within the alternate embodiment, if the vehicle communication system 126 receives the barrier status response signal(s) indicating the current state of the barrier 104*a* before the vehicle 102 exits the barrier control zone 406*b*, the barrier signal control module 134 may not send the barrier status request signal(s) to the second barrier 104*a* rather than sending the barrier status request signal(s) after sending the barrier control signal(s) to the first barrier 104*b*, as indicated within the method 600.

The method 600 may proceed to block 616, wherein the method 600 may include determining if the current state of the second barrier 104*a* is the opened state. In an exemplary embodiment, upon the transceiver 110*a* receiving the barrier status request signal(s), the barrier controller 108*a* may utilize the transceiver 110*a* to send the barrier status response signal(s) to the vehicle communication system 126 that indicate the current state of the barrier 104*a* as the opened state, the closed state, or the partially opened state. Upon receipt of the barrier status request signal(s) by the vehicle communication system 126, the barrier signal control module 134 may analyze the barrier status request signal(s) and determine if the current state of the barrier 104*a* is the opened state to allow the vehicle 102 to exit the location enclosed by the barrier 104*a*.

If it is determined that the current state of the barrier 104*a* is not the opened state (at block 616), the method 600 may proceed to block 618, wherein the method 600 may include sending a barrier control signal(s) to the second barrier 104*a* upon the vehicle 102 exiting the barrier control zone 408*b* associated with the second barrier 104*a*. In an exemplary embodiment, upon determining that the barrier 104*a* is in the closed state or the partially opened state, the barrier signal control module 134 may communicate with the location determinant module 130 to determine the location of the vehicle 102. The location determinant module 130 may communicate when it is determined that the vehicle 102 exits the barrier control zone 408*b*. Upon determining that the vehicle 102 exits the barrier control zone 408*b*, the barrier signal control module 134 may send the barrier control signal(s) to the transceiver 110*a* operably connected to the barrier controller 108*a* to traverse the barrier 104*a* to the opened state to allow the vehicle 102 to exit the location enclosed by the barrier 104*a*, during the departure of the vehicle 102.

The method 600 may proceed to block 620, wherein the method 600 may include sending a barrier status update request signal(s) to the first barrier 104*b* to determine an updated state of the first barrier 104*b*. As discussed above, upon the transceiver 110*b* receiving the barrier control signal(s) from the vehicle communication system 126, the barrier controller 108*b* may operably control the transceiver 110*b* to send the barrier status update response signal(s), to provide the updated state of the barrier 104*b*. However, in some scenarios, the vehicle 102 may exit the barrier control zone 408*b* prior to receiving the barrier status update response signal(s) from the barrier controller 108*b*.

The application 106 may ensure that the updated state of the barrier 104*b* is determined based on the barrier signal control module 134 utilizing the vehicle communication system 126 to send the barrier status update request signal(s) to the transceiver 110*b* upon the sending of the barrier control signal(s) to the second barrier 104*a* (at block 618). Consequently, based on the determination of the existence of the software flag (at block 604), the barrier control application 106 allows the determination of the updated state of the barrier 104*b* despite the potential interruption that may have been caused with respect to the vehicle communication system 126 simultaneously being utilized to send the barrier control signal(s) to the transceiver 110*a* upon the vehicle 102 exiting the barrier control zone 408*b*.

In an alternate embodiment, the barrier signal control module 134 may utilize the vehicle communication system 126 to send the barrier status update request signal(s) if it is determined that the vehicle 102 has exited the barrier control zone 408*b* before receiving the barrier status update response signal(s) from the barrier controller 108*b*. In other words, the barrier signal control module 134 may control the sending of the barrier status update request signal(s) upon the exiting of the vehicle 102 from the barrier control zone 408*b* if the updated state of the barrier 104*b* is not determined while the vehicle 102 is traveling within the barrier control zone 406*b*. Consequently, within the alternate embodiment, if the vehicle communication system 126 receives the barrier status update response signal(s) indicating the updated state of the barrier 104*b* before the vehicle 102 exits the barrier control zone 408*b*, the barrier signal control module 134 may not send the barrier status update request signal(s) to the first barrier 104*b* rather than sending the barrier status update request signal(s) after sending the barrier control signal(s), as indicated within the method 600.

The method 600 may proceed to block 622, wherein the method 600 may include sending a barrier status request signal(s) to the second barrier 104*a* to determine an updated state of the second barrier 104*a*. As discussed above, in some scenarios, the reception of the barrier status update response signal(s) from the barrier controller 108*b* to provide the update state of the barrier 104*b* may interrupt the reception of the barrier status update response signal(s) that may be sent from the transceiver 110*a* upon receiving of the barrier control signal(s) to traverse the barrier 104*a* to the opened state.

The application 106 may ensure that the updated state of the barrier 104*a* is determined based on the barrier signal control module 134 utilizing the vehicle communication system 126 to send the barrier status update request signal(s) to the transceiver 110*a* upon the sending the barrier status update request signal(s) and receiving the barrier status update response signal(s) to and from the transceiver 110b. Consequently, based on the determination of the existence of the software flag (at block 604), the barrier control application 106 allows the determination of the updated state of the barrier 104a despite the potential interruption that may have been caused with respect to the vehicle communication system 126 simultaneously being utilized to receive the barrier status update response signal(s) from the transceiver 110b upon the vehicle 102 exiting the barrier control zone 408b.

In an alternate embodiment, if the vehicle communication system 126 receives the barrier status update response signal(s) indicating the updated state of the barrier 104b before the vehicle 102 exits the barrier control zone 408b, the barrier signal control module 134 may receive the barrier status update response signal(s) from the transceiver 110a upon the sending of the barrier control signal(s) to traverse the barrier 104a. In other words, since there may not be any potential interruption with respect to the reception of the barrier status update response signal(s) by the vehicle communication system 126, the barrier signal control module 134 may not utilize the vehicle communication system 126 to send the barrier status request signal(s) to determine the state of the barrier 104b, as indicated within the method 500.

The method 600 may proceed to block 624, wherein the method 600 may include sending a barrier control signal(s) to the second barrier 104a upon the vehicle 102 exiting an external barrier control zone 410b associated with the second barrier 104a. In an exemplary embodiment, upon determining that the updated state of the barrier 104a is in the opened state or the partially opened state (e.g., after the sending of the barrier control signal(s) to traverse the barrier 104a to the opened state at block 618), the barrier signal control module 134 may communicate with the location determinant module 130 to determine the location of the vehicle 102. The location determinant module 130 may communicate the determination that the vehicle 102 exits the external barrier control zone 410b. Upon determining that the vehicle 102 exits the external barrier control zone 410b, the barrier signal control module 134 may send the barrier control signal(s) to the transceiver 110a operably connected to the barrier controller 108a to traverse the barrier 104a to the closed state to thereby close the barrier 104a as the vehicle 102 departs away from the barrier 104a.

The method 600 may proceed to block 626, wherein the method 600 may include presenting the updated state of the first barrier 104b and/or the second barrier 104a. In an exemplary embodiment, upon the vehicle communication system 126 receiving the barrier status update response signal(s) from the respective transceivers 110a, 110b, the barrier signal control module 134 may analyze the received signals and may determine the updated states of the respective barriers 104a, 104b. The barrier signal control module 134 may communicate the updated states of the respective barriers 104a, 104b to the barrier status presentation module 136. The barrier status presentation module 136 may utilize the display unit 116 of the vehicle 102 to present the barrier status user interface with the user interface graphic/text that presents the updated state of the barrier 104a and/or the updated state of the barrier 104b to the user to allow the user to determine if the barrier 104a and/or the barrier 104b have autonomously traversed to the opened or closed state based on the sending of the barrier control signal(s) to the respective transceivers 110a, 110b as the vehicle 102 exited the barrier control zones 406b, 408b and/or the external barrier control zone 410b.

Figure 7:
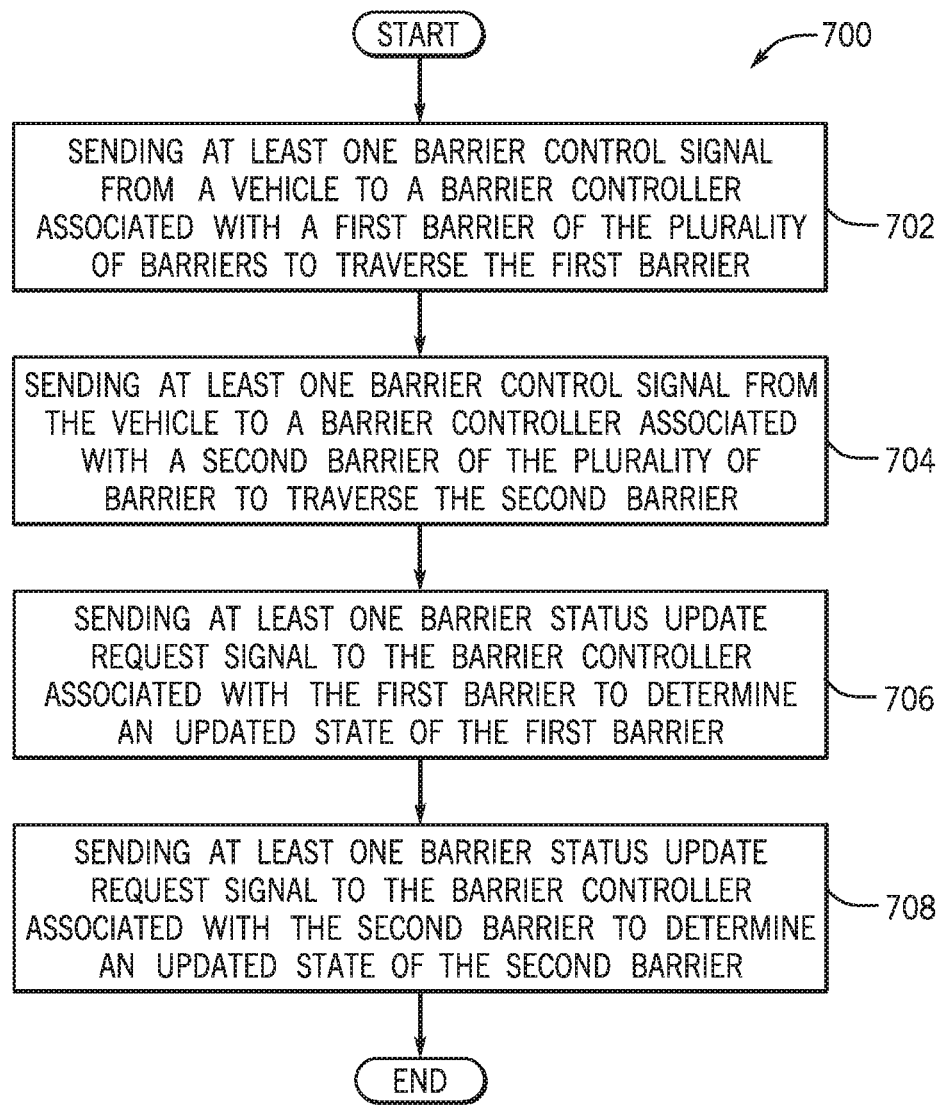
FIG. 7 is a process flow diagram of a method for managing autonomous operation of the plurality of barriers according to an exemplary embodiment.

FIG. 7 is a process flow diagram of a method 700 for managing autonomous operation of the plurality of barriers 104a, 104b according to an exemplary embodiment. FIG. 7 will be described with reference to the components of FIG. 1 though it is to be appreciated that the method 700 of FIG. 7 may be used with other systems and/or components. The method 700 may begin at block 702, wherein the method 700 may include sending at least one barrier control signal to a barrier controller 108a associated with a first barrier 104a of the plurality of barriers 104a, 104b to traverse the first barrier 104a.

The method 700 may proceed to block 704, wherein the method 700 may include sending at least one barrier control signal to a barrier controller 108b associated with a second barrier 104b of the plurality of barriers 104a, 104b to traverse the second barrier 104b. The method 700 may proceed to block 706, wherein the method 700 may include sending at least one barrier status update request signals to the barrier controller 108a associated with the first barrier 104a to determine an updated state of the first barrier 104a. The method 700 may proceed to block 708, wherein the method 700 may include sending at least one barrier status update request signal to the barrier controller associated with the second barrier 104b to determine an updated state of the second barrier 104b.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for managing autonomous operation of a plurality of barriers, comprising:
sending at least one barrier control signal from a vehicle to a barrier controller associated with a first barrier of the plurality of barriers to traverse the first barrier;

sending at least one barrier control signal from the vehicle to a barrier controller associated with a second barrier of the plurality of barriers to traverse the second barrier;

sending at least one barrier status update request signal to the barrier controller associated with the first barrier to determine an updated state of the first barrier, wherein the updated state of the first barrier is determined upon determining a current state of the first barrier and the second barrier and traversing the first barrier and the second barrier; and sending at least one barrier status update request signal to the barrier controller associated with the second barrier to determine an updated state of the second barrier, wherein the updated state of the second barrier is determined upon determining the updated state of the first barrier.

2. The computer-implemented method of claim 1, further including storing a data flag from a storage unit of the vehicle that indicates the existence of the plurality of barriers based on determining that a geo-location of the first barrier is within a predetermined distance of a geo-location of the second barrier.

3. The computer-implemented method of claim 2, wherein the data flag is retrieved from the storage unit and a dedicated software flow is executed to manage the sending of the at least one barrier status update request signal to the barrier control associated with the first barrier and the at least one barrier status update request signal to the barrier controller associated with the second barrier.

4. The computer-implemented method of claim 1, further including determining that the vehicle enters at least one of: an arrival status zone and a departure status zone associated with the first barrier, wherein the vehicle sends at least one barrier status request signal to the barrier controller associated with the first barrier to determine the current state of the first barrier.

5. The computer-implemented method of claim 4, wherein sending the at least one barrier control signal to the barrier controller associated with the first barrier of the plurality of barriers includes determining that the vehicle enters or exits a barrier control zone associated with the first barrier, wherein the at least one barrier control signal is sent to the barrier controller associated with the first barrier based on the current state of the first barrier and a traveling direction of the vehicle with respect to the first barrier.

6. The computer-implemented method of claim 5, wherein sending the at least one barrier control signal to the barrier controller associated with the first barrier of the plurality of barriers includes sending the at least one barrier status request signal to the barrier controller associated with the second barrier to determine the current state of the second barrier upon the vehicle entering or exiting the barrier control zone associated with the first barrier.

7. The computer-implemented method of claim 6, wherein sending the at least one barrier control signal to the barrier controller associated with the second barrier of the plurality of barriers includes determining that the vehicle enters or exits a barrier control zone associated with the second barrier, wherein the at least one barrier control signal is sent to the barrier controller associated with the second barrier based on the current state of the second barrier and the traveling direction of the vehicle with respect to the second barrier.

8. The computer-implemented method of claim 7, wherein sending the at least one barrier status update request signal to the barrier controller associated with the first barrier includes sending the at least one barrier status update request signal after the vehicle enters or exits the barrier control zone associated with the second barrier, wherein the barrier controller associated with the first barrier sends at least one barrier update response signal upon receiving the at least one barrier status update request signal, wherein the at least one barrier update response signal is analyzed to determine the updated state of the first barrier.

9. The computer-implemented method of claim 7, wherein sending the at least one barrier status update request signal to the barrier controller associated with the second barrier includes sending the at least one barrier status update request signal after the vehicle enters or exits the barrier control zone associated with the second barrier, wherein the barrier controller associated with the second barrier sends at least one barrier update response signal upon receiving the at least one barrier status update request signal, wherein the at least one barrier update response signal is analyzed to determine the updated state of the second barrier.

10. A system for managing autonomous operation of a plurality of barriers, comprising:
a memory storing instructions when executed by a processor cause the processor to:
send at least one barrier control signal from a vehicle to a barrier controller associated with a first barrier of the plurality of barriers to traverse the first barrier;
send at least one barrier control signal from the vehicle to a barrier controller associated with a second barrier of the plurality of barriers to traverse the second barrier;
send at least one barrier status update request signal to the barrier controller associated with the first barrier to determine an updated state of the first barrier, wherein the updated state of the first barrier is determined upon determining a current state of the first barrier and the second barrier and traversing the first barrier and the second barrier; and
send at least one barrier status update request signal to the barrier controller associated with the second barrier to determine an updated state of the second barrier, wherein the updated state of the second barrier is determined upon determining the updated state of the first barrier.

11. The system of claim 10, further including storing a data flag from a storage unit of the vehicle that indicates the existence of the plurality of barriers based on determining that a geo-location of the first barrier is within a predetermined distance of a geo-location of the second barrier.

12. The system of claim 11, wherein the data flag is retrieved from the storage unit and a dedicated software flow is executed to manage the sending of the at least one barrier status update request signal to the barrier control associated with the first barrier and the at least one barrier status update request signal to the barrier controller associated with the second barrier.

13. The system of claim 10, further including determining that the vehicle enters at least one of: an arrival status zone and a departure status zone associated with the first barrier, wherein the vehicle sends at least one barrier status request signal to the barrier controller associated with the first barrier to determine the current state of the first barrier.

14. The system of claim 13, wherein sending the at least one barrier control signal to the barrier controller associated with the first barrier of the plurality of barriers includes determining that the vehicle enters or exits a barrier control zone associated with the first barrier, wherein the at least one barrier control signal is sent to the barrier controller associated with the first barrier based on the current state of the first barrier and a traveling direction of the vehicle with respect to the first barrier.

15. The system of claim 14, wherein sending the at least one barrier control signal to the barrier controller associated with the first barrier of the plurality of barriers includes sending the at least one barrier status request signal to the barrier controller associated with the second barrier to determine the current state of the second barrier upon the vehicle entering or exiting the barrier control zone associated with the first barrier.

16. The system of claim 15, wherein sending the at least one barrier control signal to the barrier controller associated with the second barrier of the plurality of barriers includes determining that the vehicle enters or exits a barrier control zone associated with the second barrier, wherein the at least one barrier control signal is sent to the barrier controller associated with the second barrier based on the current state of the second barrier and the traveling direction of the vehicle with respect to the second barrier.

17. The system of claim 16, wherein sending the at least one barrier status update request signal to the barrier controller associated with the first barrier includes sending the at least one barrier status update request signal after the vehicle enters or exits the barrier control zone associated with the second barrier, wherein the barrier controller associated with the first barrier sends at least one barrier update response signal upon receiving the at least one barrier status update request signal, wherein the at least one barrier update response signal is analyzed to determine the updated state of the first barrier.

18. The system of claim 16, wherein sending the at least one barrier status update request signal to the barrier controller associated with the second barrier includes sending the at least one barrier status update request signal after the vehicle enters or exits the barrier control zone associated with the second barrier, wherein the barrier controller associated with the second barrier sends at least one barrier update response signal upon receiving the at least one barrier status update request signal, wherein the at least one barrier update response signal is analyzed to determine the updated state of the second barrier.

19. A non-transitory computer readable storage medium storing instructions that when executed by a computer, which includes a processor, perform a method, the method comprising:
   sending at least one barrier control signal from a vehicle to a barrier controller associated with a first barrier of a plurality of barriers to traverse the first barrier;
   sending at least one barrier control signal from the vehicle to a barrier controller associated with a second barrier of the plurality of barriers to traverse the second barrier;
   sending at least one barrier status update request signal to the barrier controller associated with the first barrier to determine an updated state of the first barrier, wherein the updated state of the first barrier is determined upon determining a current state of the first barrier and the second barrier and traversing the first barrier and the second barrier; and
   sending at least one barrier status update request signal to the barrier controller associated with the second barrier to determine an updated state of the second barrier, wherein the updated state of the second barrier is determined upon determining the updated state of the first barrier.

20. The non-transitory computer readable storage medium of claim 19, further including storing a data flag from a storage unit of the vehicle that indicates the existence of the plurality of barriers based on determining that a geo-location of the first barrier is within a predetermined distance of a geo-location of the second barrier.

* * * * *